US011023879B2

(12) United States Patent
Dou

(10) Patent No.: US 11,023,879 B2
(45) Date of Patent: Jun. 1, 2021

(54) RECOMMENDING TARGET TRANSACTION CODE SETTING REGION

(71) Applicant: Advanced New Technologies Co., Ltd., Grand Cayman (KY)

(72) Inventor: Weifeng Dou, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/802,973

(22) Filed: Feb. 27, 2020

(65) Prior Publication Data

US 2021/0065157 A1 Mar. 4, 2021

Related U.S. Application Data

(63) Continuation of application No. PCT/CN2020/072113, filed on Jan. 15, 2020.

(30) Foreign Application Priority Data

Aug. 30, 2019 (CN) .......................... 201910814546.3

(51) Int. Cl.
*G06Q 20/32* (2012.01)
*G06Q 30/02* (2012.01)
*G06Q 20/42* (2012.01)

(52) U.S. Cl.
CPC ..... *G06Q 20/3224* (2013.01); *G06Q 20/3276* (2013.01); *G06Q 20/425* (2013.01); *G06Q 30/0205* (2013.01)

(58) Field of Classification Search
None
See application file for complete search history.

(56) References Cited

U.S. PATENT DOCUMENTS 9,720,092 B2* 8/2017 Moussalli ............... G01S 19/13
2005/0159996 A1* 7/2005 Lazarus ............. G06Q 30/0202
705/7.31

(Continued)

FOREIGN PATENT DOCUMENTS

CN 108053240 5/2018
CN 108804419 11/2018

(Continued)

OTHER PUBLICATIONS

Qun Wei & Li Duan, Research and Implementation of Mobile Advertising System Based on Location Service (Year: 2017).*

(Continued)

*Primary Examiner* — Akosua Kyereme-Tuah
(74) *Attorney, Agent, or Firm* — Fish & Richardson P.C.

(57) ABSTRACT

Implementations of the present specification disclose a method and a system for recommending a target transaction code setting region. The method includes the following: dividing a target region to obtain multiple sub-regions, where the multiple sub-regions include one or more label sub-regions with known target transaction code setting effects and one or more sample sub-regions with unknown target transaction code setting effects; obtaining an association feature between the multiple sub-regions; obtaining predicted effect values of setting a target transaction code in the one or more sample sub-regions by using a prediction algorithm based on at least estimated effect values of setting a target transaction code in the one or more label sub-regions and the association feature; and determining at least one recommended region for setting a target transaction code from the one or more sample sub-regions based on at least the one or more predicted effect values.

26 Claims, 8 Drawing Sheets

(56) References Cited

U.S. PATENT DOCUMENTS

| | | | |
|---|---|---|---|
| 2005/0273380 A1* | 12/2005 | Schroeder | G06Q 10/0639 |
| | | | 705/7.31 |
| 2007/0282785 A1* | 12/2007 | Fayyad | G06Q 30/0207 |
| 2012/0066066 A1* | 3/2012 | Jain | G06Q 30/0261 |
| | | | 705/14.58 |
| 2014/0108417 A1 | 4/2014 | Chakrabarti et al. | |
| 2015/0169726 A1* | 6/2015 | Kara | G06F 16/248 |
| | | | 707/737 |

FOREIGN PATENT DOCUMENTS

| | | |
|---|---|---|
| CN | 109102324 | 12/2018 |
| CN | 109146580 | 1/2019 |
| CN | 109345285 | 2/2019 |
| CN | 110544088 | 12/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/072113, dated May 28, 2020, 15 pages (with machine translation).

\* cited by examiner

RECOMMENDING TARGET TRANSACTION CODE SETTING REGION

CROSS-REFERENCE TO RELATED APPLICATIONS

This application is a continuation of PCT Application No. PCT/CN2020/072113, filed on Jan. 15, 2020, which claims priority to Chinese Patent Application No. 201910814546.3, filed on Aug. 30, 2019, and each application is hereby incorporated by reference in its entirety.

TECHNICAL FIELD

Implementations of the present specification relate to the field of data processing technologies, and in particular, to methods, systems, and apparatuses for recommending a target transaction code setting region.

BACKGROUND

With the development of Internet technologies and the popularization of intelligent end-user devices, various payment methods emerge. The methods include an offline network transaction method that users complete a related transaction through code scanning. Specifically, promotional materials, for example, two-dimensional code labels, roll up banners, posters, advertisements, or books, with a transaction code (e.g., a collection code or a red packet code) printed in a cooperative store can be set. After arriving at the store, a user can scan the transaction code by using an application installed on an intelligent end-user device, to complete payment, obtain a certain discount during payment, or obtain a red packet, a coupon, etc. with a certain amount. The certain amount can be deducted by using the red packet, the coupon, etc. when offline payment is performed by using the application next time. Therefore, more users are attracted to use the application to complete offline payment.

SUMMARY

One aspect of implementations of the present specification provides a method for recommending a target transaction code setting region, where the method for recommending a target transaction code setting region includes the following: dividing a target region to obtain multiple sub-regions, where the multiple sub-regions include one or more label sub-regions with known target transaction code setting effects and one or more to-be-tested sub-regions, or sample sub-regions, with unknown target transaction code setting effects; obtaining an association feature between the multiple sub-regions; obtaining predicted effect values of setting a target transaction code in the one or more to-be-tested sub-regions by using a prediction algorithm based on at least estimated effect values of setting a target transaction code in the one or more label sub-regions and the association feature; and determining at least one recommended region for setting a target transaction code from the one or more to-be-tested sub-regions based on at least the one or more predicted effect values.

In some implementations, the method for recommending a target transaction code setting region further includes the following: obtaining an estimated effect value of at least one to-be-tested sub-region; and updating at least one of the prediction algorithm and the association feature based on at least the estimated effect value of the to-be-tested sub-region.

In some implementations, the updating at least one of the prediction algorithm and the association feature based on at least the estimated effect value of the to-be-tested sub-region includes the following: updating at least one of the prediction algorithm and the association feature based on a difference between the estimated effect value of the to-be-tested sub-region and a predicted effect value of the to-be-tested sub-region.

In some implementations, the updating at least one of the prediction algorithm and the association feature based on at least the estimated effect value of the to-be-tested sub-region includes the following: updating a to-be-tested sub-region whose estimated effect value is greater than a predetermined threshold to a label sub-region.

In some implementations, the target transaction code includes at least one or more of a red packet code, a collection code, a promo code, and a redeem code.

In some implementations, the dividing a target region to obtain multiple sub-regions includes the following: dividing the target region based on a GeoHash algorithm.

In some implementations, the label sub-regions include a region where a target transaction code has been set; and a step of obtaining the estimated effect values of setting a target transaction code in the one or more label sub-regions includes the following: obtaining target transaction code usage data of the label sub-region, where the target transaction code usage data includes a first quantity of merchants conducting offline network payment transactions using a target transaction code in the label sub-region, a first ratio of a quantity of offline network payment transactions using a target transaction code to a total quantity of transactions for each of the merchants of the first quantity in the sub-region, and a second ratio of a quantity of users conducting offline network payment transactions using a target transaction code to a total quantity of users in the label sub-region; and determining the estimated effect value based on the first quantity, the first ratio, and the second ratio.

In some implementations, the method for recommending a target transaction code setting region further includes the following: obtaining association data between the multiple sub-regions; and determining the association feature between the multiple sub-regions based on the association data.

In some implementations, the association data includes at least one second quantity, and the second quantity is a quantity of common users conducting offline network payment transactions in two sub-regions within a first predetermined time period; and the determining the association feature between the multiple sub-regions based on the association data includes the following: determining whether the second quantity is greater than a first predetermined threshold; and if the second quantity is greater than the first predetermined threshold, determining an association relationship between two sub-regions related to the second quantity to construct an association map, and determining the association map as the association feature between the multiple sub-regions.

In some implementations, the prediction algorithm includes a graph propagation algorithm.

In some implementations, the association data includes at least one second quantity, and the second quantity is a quantity of common users conducting offline network payment transactions in two sub-regions within a first predetermined time period; and the determining the association feature between the multiple sub-regions based on the association data includes the following: determining, based on the second quantity, whether there is an association between two sub-regions related to the second quantity and association strength to construct an association map, and determining the association map as the association feature between the multiple sub-regions, where the association strength is positively correlated with the second quantity.

In some implementations, the prediction algorithm includes the following: determining a label sub-region associated with a to-be-tested sub-region based on the association map; and determining a predicted effect value of setting a target transaction code in the to-be-tested sub-region based on an estimated effect value of the label sub-region associated with the to-be-tested sub-region and association strength associated with the to-be-tested sub-region.

In some implementations, the determining at least one recommended region for setting a target transaction code from the one or more to-be-tested sub-regions based on at least the predicted effect values includes the following: determining whether a predicted effect value of a to-be-tested sub-region where no target transaction code has been set is greater than a second predetermined threshold; and if the predicted effect value is greater than the second predetermined threshold, determining the to-be-tested sub-region where no target transaction code has been set as a recommended region for setting a target transaction code.

In some implementations, the determining at least one recommended region for setting a target transaction code from the one or more to-be-tested sub-regions based on at least the predicted effect values includes the following: obtaining feature data of the one or more to-be-tested sub-regions and a predetermined condition corresponding to the feature data, where the feature data includes a third quantity of users conducting offline network payment transactions within a second predetermined time period in the to-be-tested sub-region, a fourth quantity of merchants conducting offline network payment transactions within the second predetermined time period in the to-be-tested sub-region, a third ratio of the quantity of merchants conducting offline network payment transactions within the second predetermined time period in the to-be-tested sub-region to a total quantity of merchants in the to-be-tested sub-region, or a type of a point of interest corresponding to the to-be-tested sub-region; determining whether the predicted effect value of the to-be-tested sub-region is greater than a second predetermined threshold and whether at least one type of feature data satisfies the predetermined condition; and if the predicted effect value is greater than the second predetermined threshold and the at least one type of feature data satisfies the predetermined condition, determining the to-be-tested sub-region as a recommended region for setting a target transaction code.

In some implementations, the predetermined condition includes at least one or a combination of the following conditions: the third quantity is greater than a third predetermined threshold; the fourth quantity is greater than a fourth predetermined threshold; the third ratio is greater than a fifth predetermined threshold; and the type of the point of interest is the same as at least one predetermined type of a point of interest.

In some implementations, the method further includes the following: combining adjacent recommended regions.

Another aspect of the implementations of the present specification provides a system for recommending a target transaction code setting region, where the system includes a division module, an acquisition module, and a determining module. The division module is configured to divide a target region to obtain multiple sub-regions, where the multiple sub-regions include one or more label sub-regions with known target transaction code setting effects and one or more to-be-tested sub-regions with unknown target transaction code setting effects; the acquisition module is configured to obtain an association feature between the multiple sub-regions; and the determining module is configured to obtain predicted effect values of setting a target transaction code in the one or more to-be-tested sub-regions by using a prediction algorithm based on at least estimated effect values of setting a target transaction code in the one or more label sub-regions and the association feature; and determine at least one recommended region for setting a target transaction code from the one or more to-be-tested sub-regions based on at least the one or more predicted effect values.

In some implementations, the system further includes an update module. The update module is configured to obtain an estimated effect value of at least one to-be-tested sub-region; and update at least one of the prediction algorithm and the association feature based on at least the estimated effect value of the to-be-tested sub-region.

In some implementations, the update module is further configured to update at least one of the prediction algorithm and the association feature based on a difference between the estimated effect value of the to-be-tested sub-region and a predicted effect value of the to-be-tested sub-region.

In some implementations, the update module is further configured to update a to-be-tested sub-region whose estimated effect value is greater than a predetermined threshold to a label sub-region.

In some implementations, the target transaction code includes at least one or more of a red packet code, a collection code, a promo code, and a redeem code.

In some implementations, the division module is configured to divide the target region based on a GeoHash algorithm to obtain the multiple sub-regions.

In some implementations, the label sub-regions include a region where a target transaction code has been set; and the acquisition module is further configured to obtain target transaction code usage data of the label sub-region, where the target transaction code usage data includes a first quantity of merchants conducting offline network payment transactions using a target transaction code in the label sub-region, a first ratio of a quantity of offline network payment transactions using a target transaction code to a total quantity of transactions for each of the merchants of the first quantity in the sub-region, and a second ratio of a quantity of users conducting offline network payment transactions using a target transaction code to a total quantity of users in the label sub-region; and determine the estimated effect value based on the first quantity, the first ratio, and the second ratio.

In some implementations, the acquisition module is further configured to obtain association data between the multiple sub-regions; and determine the association feature between the multiple sub-regions based on the association data.

In some implementations, the association data includes at least one second quantity, and the second quantity is a quantity of common users conducting offline network payment transactions in two sub-regions within a first predetermined time period; and the acquisition module is further configured to determine whether the second quantity is greater than a first predetermined threshold; and if the second quantity is greater than the first predetermined threshold, determine an association relationship between two sub-regions related to the second quantity to construct an association map, and determine the association map as the association feature between the multiple sub-regions.

In some implementations, the prediction algorithm includes a graph propagation algorithm.

In some implementations, the association data includes at least one second quantity, and the second quantity is a quantity of common users conducting offline network payment transactions in two sub-regions within a first predetermined time period; and the acquisition module is further configured to determine, based on the second quantity, whether there is an association between two sub-regions related to the second quantity and association strength to construct an association map, and determine the association map as the association feature between the multiple sub-regions, where the association strength is positively correlated with the second quantity.

In some implementations, the prediction algorithm includes the following: determining a label sub-region associated with a to-be-tested sub-region based on the association map; and determining a predicted effect value of setting a target transaction code in the to-be-tested sub-region based on an estimated effect value of the label sub-region associated with the to-be-tested sub-region and association strength associated with the to-be-tested sub-region.

In some implementations, the determining module is further configured to determine whether a predicted effect value of a to-be-tested sub-region where no target transaction code has been set is greater than a second predetermined threshold; and if the predicted effect value is greater than the second predetermined threshold, determine the to-be-tested sub-region where no target transaction code has been set as a recommended region for setting a target transaction code.

In some implementations, the determining module is further configured to obtain feature data of the one or more to-be-tested sub-regions and a predetermined condition corresponding to the feature data, where the feature data includes a third quantity of users conducting offline network payment transactions within a second predetermined time period in the to-be-tested sub-region, a fourth quantity of merchants conducting offline network payment transactions within the second predetermined time period in the to-be-tested sub-region, a third ratio of the quantity of merchants conducting offline network payment transactions within the second predetermined time period in the to-be-tested sub-region to a total quantity of merchants in the to-be-tested sub-region, or a type of a point of interest corresponding to the to-be-tested sub-region; determine whether the predicted effect value of the to-be-tested sub-region is greater than a second predetermined threshold and whether at least one type of feature data satisfies the predetermined condition; and if the predicted effect value is greater than the second predetermined threshold and the at least one type of feature data satisfies the predetermined condition, determine the to-be-tested sub-region as a recommended region for setting a target transaction code.

In some implementations, the predetermined condition includes at least one or a combination of the following conditions: the third quantity is greater than a third predetermined threshold; the fourth quantity is greater than a fourth predetermined threshold; the third ratio is greater than a fifth predetermined threshold; and the type of the point of interest is the same as at least one predetermined type of a point of interest.

In some implementations, the determining module is further configured to combine adjacent recommended regions.

One aspect of the implementations of the present specification provides an apparatus for recommending a target transaction code setting region, where the apparatus includes a processor and a storage, the storage is configured to store an instruction, and the apparatus implements any method for determining a recommended region for a target transaction code described above when the instruction is executed by the processor.

One aspect of the implementations of the present specification provides a computer-readable storage medium, where the storage medium stores a computer instruction, and a computer runs any method for determining a recommended region for a target transaction code described above after the computer reads the computer instruction in the storage medium.

BRIEF DESCRIPTION OF DRAWINGS

The present specification is further described by way of example implementations, and the example implementations are described in detail with reference to the accompanying drawings. These implementations are not limitative. In these implementations, the same number represents the same structure.

DESCRIPTION OF IMPLEMENTATIONS

Figure 1:
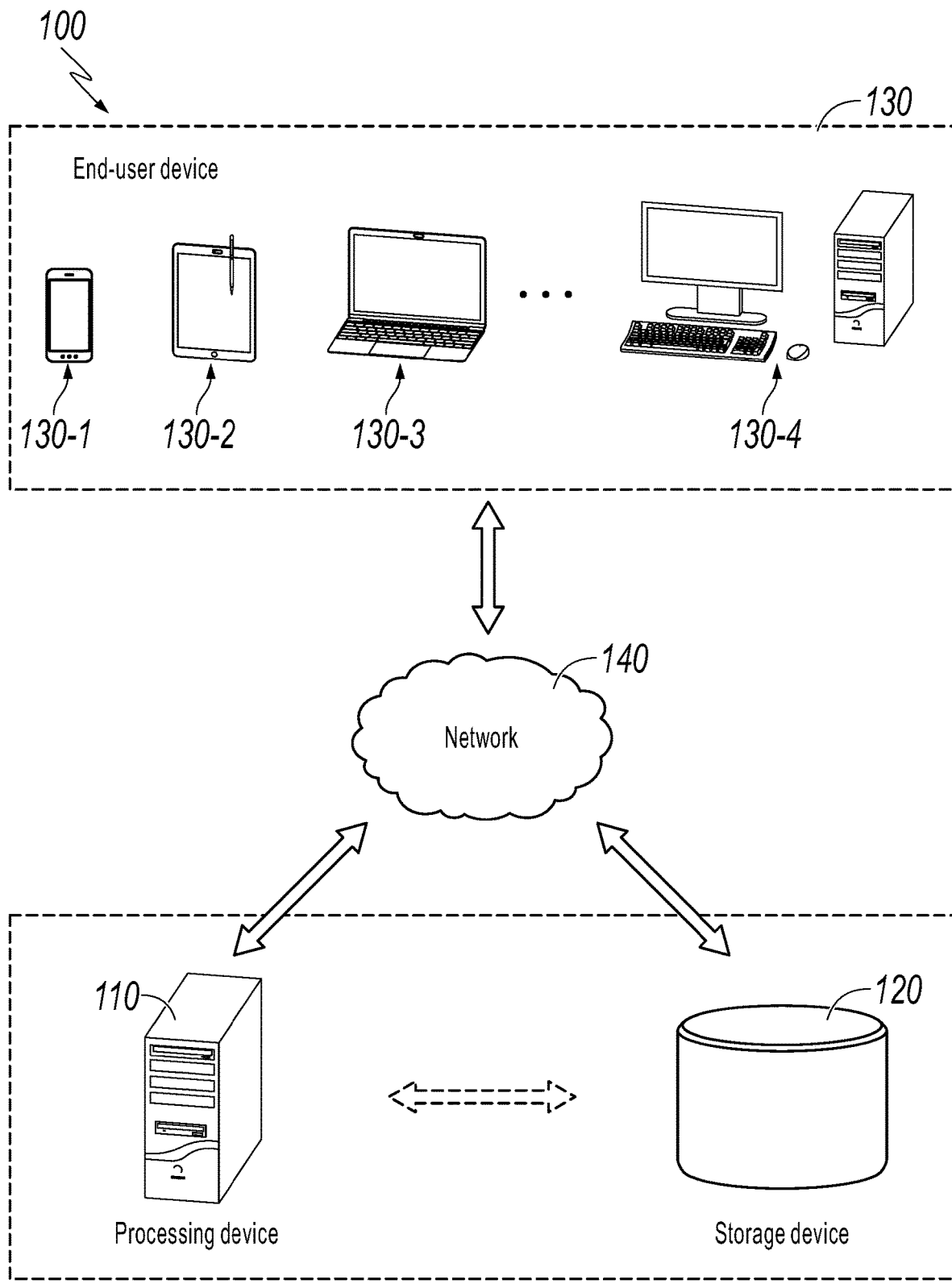
FIG. 1 is a schematic diagram illustrating an example system for determining a recommended region, according to some implementations of the present specification.

To describe the technical solutions of the implementations of the present specification more clearly, the following briefly describes the accompanying drawings needed for describing the implementations. It is clear that the accompanying drawings in the following description are merely some examples or implementations of the present specification, and a person of ordinary skill in the art can apply the present specification to other similar scenarios based on the accompanying drawings without creative efforts. The same number represents the same structure or operation unless obvious in the language environment or otherwise specified.

It should be understood that at least one of the "system", "apparatus", "unit", and "module" used in the present specification is used to distinguish different components, elements, parts, or assemblies of different levels. However, if other words can achieve the same purpose, the words can be replaced by other expressions.

As shown in the present specification and the claims, the words "one", "a", and/or "the" do not necessarily refer to singular forms and can also include plural forms unless exceptional situations are expressly indicated in the context. Generally, the terms "include" and "contain" indicate only steps and elements that are clearly identified, these steps and elements do not form an exclusive list, and a method or a device can also include other steps or elements.

A flowchart is used in the present specification to describe operations performed by the system in the implementations of the present specification. It should be understood that operations are not necessarily performed accurately in a sequence. Instead, the steps can be processed in reverse order or simultaneously. In addition, other operations can be added to these processes, or a certain operation or several operations can be removed from these processes.

The term "target transaction code" used in the present specification can refer to a specified geometric pattern that is distributed in a plane or space based on a specific rule and used to include data information. The geometric pattern includes but is not limited to a barcode, a two-dimensional code, etc. A computing device can read the data information included in the target transaction code. For example, after a user of a smartphone scans a target transaction code by using an application with a code scanning function installed on the smartphone, the user can perform a specified operation and/or obtain a specified virtual product, including paying transaction money, and obtaining a red packet, a bonus, a deduction, a coupon, a gift, etc. The target transaction code can include one or more of a red packet code, a promo code, a redeem code, a collection code, a payment code, etc. The term "offline network payment transaction" can be a transaction performed by both parties or multiple parties involved in the transaction face to face through online payment (e.g., by using a network payment platform). For example, after consumption in a store, a consumer pays a consumption amount to the store by using a payment application. The term "user" can be a consumer. The term "merchant" can be an individual or an organization that provides services or consumer goods. It should be understood that application scenarios of the system and the method mentioned in the present specification are merely some examples or implementations of the present specification, and a person of ordinary skill in the art can further apply the present specification to other similar scenarios based on the accompanying drawings without creative efforts.

Because of the wide range of regions around the world, marketing teams of payment applications are concerned about regions where conversion rates or benefits of transaction code materials can be higher. Therefore, the present specification provides a big data-based method for selecting a target transaction code setting region, so that a marketing policy implemented by using an offline target transaction code can be implemented in suitable regions, and a better effect can be achieved.

FIG. 1 is a schematic diagram illustrating an example system for determining a recommended region, according to some implementations of the present specification. In some implementations, the system 100 for determining a recommended region can be configured to recommend a region for setting a target transaction code, for example, a red packet code. As shown in FIG. 1, the system 100 for determining a recommended region can include a processing device 110, a storage device 120, an end-user device 130, and a network 140.

The processing device 110 can be configured to process at least one of information and data associated with code scanning payment to perform one or more of the functions disclosed in the present specification. For example, the processing device 110 can be configured to determine a setting effect of a region where a target transaction code has been set. Still for example, the processing device 110 can predict an effect of setting a target transaction code in a region where no target transaction code has been set based on the setting effect of the region where a target transaction code has been set and an association relationship between the region where a target transaction code has been set and the region where no target transaction code has been set. Still for example, the processing device 110 can update at least one of a model and an algorithm for determining a setting effect. In some implementations, the processing device 110 can include one or more processing engines (e.g., a single core processing engine or a multi-core processor). By way of example only, the processing device 110 can include one or a combination of a central processing unit (CPU), an application-specific integrated circuit (ASIC), an application-specific instruction set processor (ASIP), a graphics processing unit (GPU), a physical operation processing unit (PPU), a digital signal processor (DSP), a field programmable gate array (FPGA), a programmable logic device (PLD), a controller, a microcontroller unit, a reduced instruction set computer (RISC), a microprocessor, etc.

The storage device 120 can store at least one of data and an instruction. In some implementations, the storage device 120 can store data collected from the end-user device 130. The data can be data associated with code scanning payment, for example, code scanning transaction data such as a code scanning time, a code scanning location, a payment amount, a payee, or a payer, or target transaction code usage data such as whether to conduct a transaction after a target transaction code is scanned, whether to conduct a transaction by using a virtual product obtained by scanning a target transaction code, etc. In some implementations, the data can be region-related data, for example, a type of a point of interest of a region, a quantity of stores in a region, customer traffic in a region, or association data between regions such as a quantity of common users. In some implementations, the storage device 120 can store at least one of data and an instruction for being executed or used by the processing device 110, and the processing device 110 can implement the example method in the present specification by executing or using at least one of the data and the instruction. In some implementations, the storage device 120 can be connected to the network 140 to implement communication with one or more components (e.g., the processing device 110 or the end-user device 130) in the system 100 for determining a recommended region. One or more components in the system 100 for determining a recommended region can access the data or the instruction stored in the storage device 120 through the network 140. In some implementations, the storage device 120 can be directly connected to or communicate with one or more components (e.g., the processing device 110 or the end-user device 130) in the system 100 for determining a recommended region. In some implementations, the storage device 120 can be a part of the processing device 110. In some implementations, the storage device 120 can include a mass memory, a removable memory, a volatile access memory, a read-only memory (ROM), etc., or a combination thereof. For example, the mass memory can include a disk, an optical disc, and a solid state disk. For example, the removable memory can include a flash drive, a floppy disk, an optical disc, a memory card, a compressed disk, and a magnetic tape. For example, a volatile read-only memory can include a random access memory (RAM). For example, the RAM can include a dynamic RAM (DRAM), a double data rate synchronous dynamic RAM (DDR SDRAM), a static RAM (SRAM), a thyristor RAM (T-RAM), and a zero-capacitor RAM (Z-RAM). For example, the ROM can include a mask ROM (MROM), a programmable ROM (PROM), an erasable programmable ROM (EPROM), an electronic erasable programmable ROM (EEPROM), a compact disc ROM (CD-ROM), and a digital versatile disc ROM. In some implementations, the storage device 120 can be implemented on a cloud platform. By way of example only, the cloud platform can include a private cloud, a public cloud, a hybrid cloud, a community cloud, a distributed cloud, an internal cloud, a multi-tier cloud, etc., or any combination thereof. For example, some algorithms or data in the present specification can be stored on a certain cloud platform and periodically updated. The processing device 110 accesses the algorithms or the data by using a network, to implement unification and exchange of the algorithms or the data on the entire platform. In particular, some historical data can be stored on one cloud platform, so that multiple processing devices 110 or end-user devices 130 access or update the data, ensuing real-time data and cross-platform use. For example, the end-user device 130 can publish offline network payment transaction data on a certain cloud platform, and the system can perform a region recommendation operation based on data of multiple end-user devices 130.

The end-user device 130 can be a device, for example, a smartphone, with at least one of a data acquisition function, a data storage function, and a data sending function. A target transaction code scanning function can be integrated into the end-user device 130, and a target transaction code can be scanned to achieve the previous objective. In some implementations, a user of the end-user device 130 can be a participant in an event after a target transaction code is scanned. For example, during code scanning payment transaction, the user of the end-user device 130 can be a customer for payment, or can be a merchant for collection. In some implementations, the end-user device 130 can include but is not limited to a mobile device 130-1, a tablet 130-2, a notebook 130-3, a desktop computer 130-4, etc., or any combination thereof. For example, the mobile device 130-1 can include but is not limited to a smartphone, a personal digital assistance (PDA), a cash register, a handheld game console, smart glasses, a smart watch, a wearable device, a virtual display device, a display enhancement device, etc., or any combination thereof. In some implementations, the end-user device 130 can send data obtained to one or more devices in the system 100 for determining a recommended region. For example, the end-user device 130 can transmit the data obtained to the processing device 110 or the storage device 120. In some implementations, the data obtained can be data related to code scanning payment, for example, data of scanning a code to obtain a red packet or data of scanning a code to pay. By way of example only, the data of scanning a code to obtain a red packet can include a red packet identifier, a red packet acquisition location, a red packet acquisition time, and a red packet amount. The data of scanning a code to pay can be collection information, a payment location, a payment time, a payment amount, etc.

In some implementations, the network 140 can facilitate the exchange of at least one of information and data. In some implementations, one or more components (e.g., the processing device 110, the storage device 120, and the end-user device 130) in the system 100 for determining a recommended region can transmit information to other components in the system 100 for determining a recommended region through the network 140. For example, the processing device 110 can obtain at least one of information and data associated with a region from a database through the network 140. In some implementations, the network 140 can be any form of wired or wireless network, or any combination thereof. By way of example only, the network 140 can be one or a combination of a wired network, an optical network, a remote communications network, an internal network, the Internet a local area network (LAN), a wide area network (WAN), a wireless local area network (WLAN), a metropolitan area network (MAN), a wide area network (WAN), a public switched telephone network (PSTN), a Bluetooth network, a ZigBee network, a near field communication (NFC) network, a Global System for Mobile Communications (GSM) network, a Code Division Multiple Access (CDMA) network, a time division multiple access (TDMA) network, a general packet radio service (GPRS) network, an Enhanced Data rates for GSM Evolution (EDGE) network, a Wideband Code Division Multiple Access (WCDMA) network, a high speed downlink packet access (HSDPA) network, a Long Term Evolution (LTE) network, a user datagram protocol (UDP) network, a Transmission Control Protocol/Internet Protocol (TCP/IP) network, a short message service (SMS) network, a Wireless Application Protocol (WAP) network, an ultra-wideband (UWB) network, a mobile communications (1G, 2G, 3G, 4G, or 5G) network, Wi-Fi, Li-Fi, the Narrowband Internet of Things (NB-IoT), an infrared communications network, etc. In some implementations, the network 140 can include one or more network access points. For example, the network 140 can include wired or wireless network access points such as base stations and/or Internet switching points 140-1, 140-2, . . . , and one or more components in the system 100 for determining a recommended region can be connected to the network 140 by using the network access points, to exchange at least one of information and data.

Figure 2:
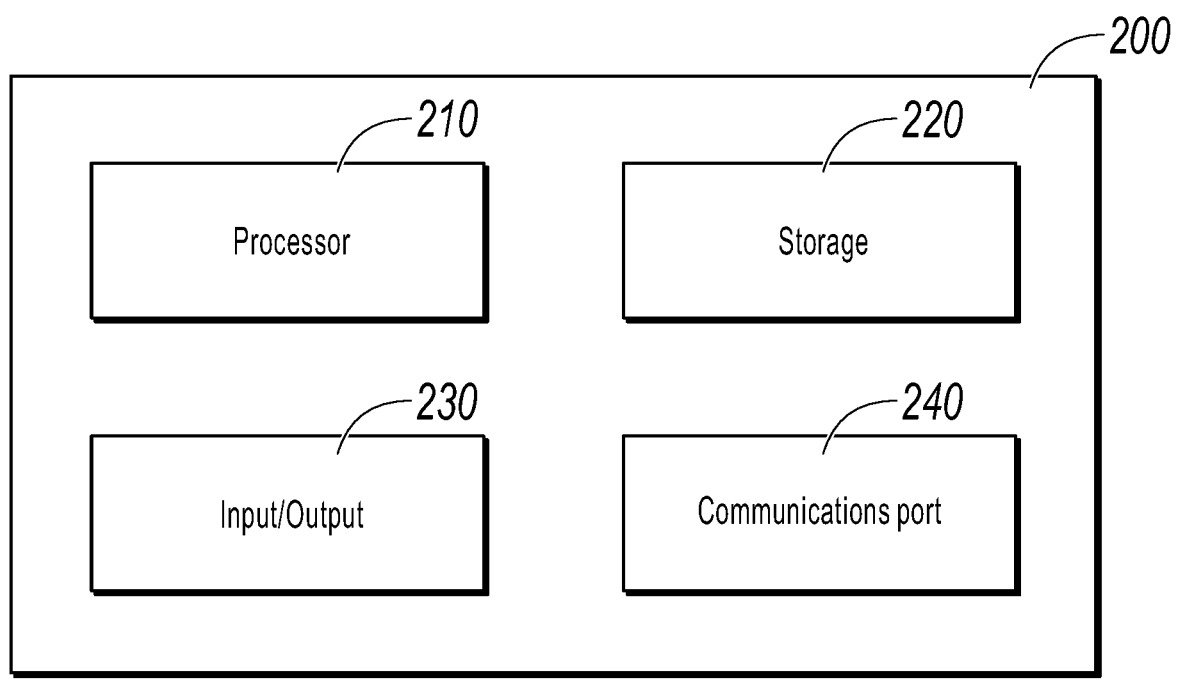
FIG. 2 is a block diagram illustrating an example processing device, according to some implementations of the present specification.

FIG. 2 is a block diagram illustrating an example processing device, according to some implementations of the present specification. The processing device 110 can include any component configured to implement the system described in the implementations of the present specification. For example, the processing device 110 can be implemented by hardware, software programs, firmware, or a combination thereof. For convenience, only one processing device is drawn in the figure. However, computing functions related to the system 100 for determining a recommended region described in the implementations of the present specification can be implemented by a group of similar platforms in a distributed way, so that processing load of the system is shared.

In some implementations, the processing device 110 can include a processor 210, a storage 220, an input/output component 230, and a communications port 240. In some implementations, the processor (e.g., a CPU) 210 can execute program instructions in the form of one or more processors. In some implementations, the storage 220 includes different forms of program memories and data memories, for example, a hard disk, a ROM, or a RAM, for storing a variety of data files processed and/or transmitted by a computer. In some implementations, the input/output component 230 can be configured to support input/output between the processing device 110 and another component. In some implementations, the communications port 240 can be connected to a network to implement data communication. For example, the processing device can include program instructions executed by the processor 210 that are stored in a ROM, a RAM, and/or another type of non-transient storage medium. At least one of the methods and the processes in the implementations of the present specification can be implemented through program instructions. The processing device 110 can also receive programs and data disclosed in the present specification through network communication.

For ease of understanding, only one processor is drawn as an example in FIG. 2. However, it is worthwhile to note that the processing device 110 in the implementations of the present specification can include multiple processors. Therefore, at least one of operations and methods implemented by one processor described in the implementations of the present specification can also be implemented by multiple processors jointly or independently. For example, in the present specification, the processor of the processing device 110 performs step 1 and step 2. It should be understood that step 1 and step 2 can also be performed by two different processors of the processing device 110 jointly or independently (e.g., a first processor performs step 1, and a second processor performs step 2, or a first processor and a second processor jointly perform step 1 and step 2).

Figure 3:
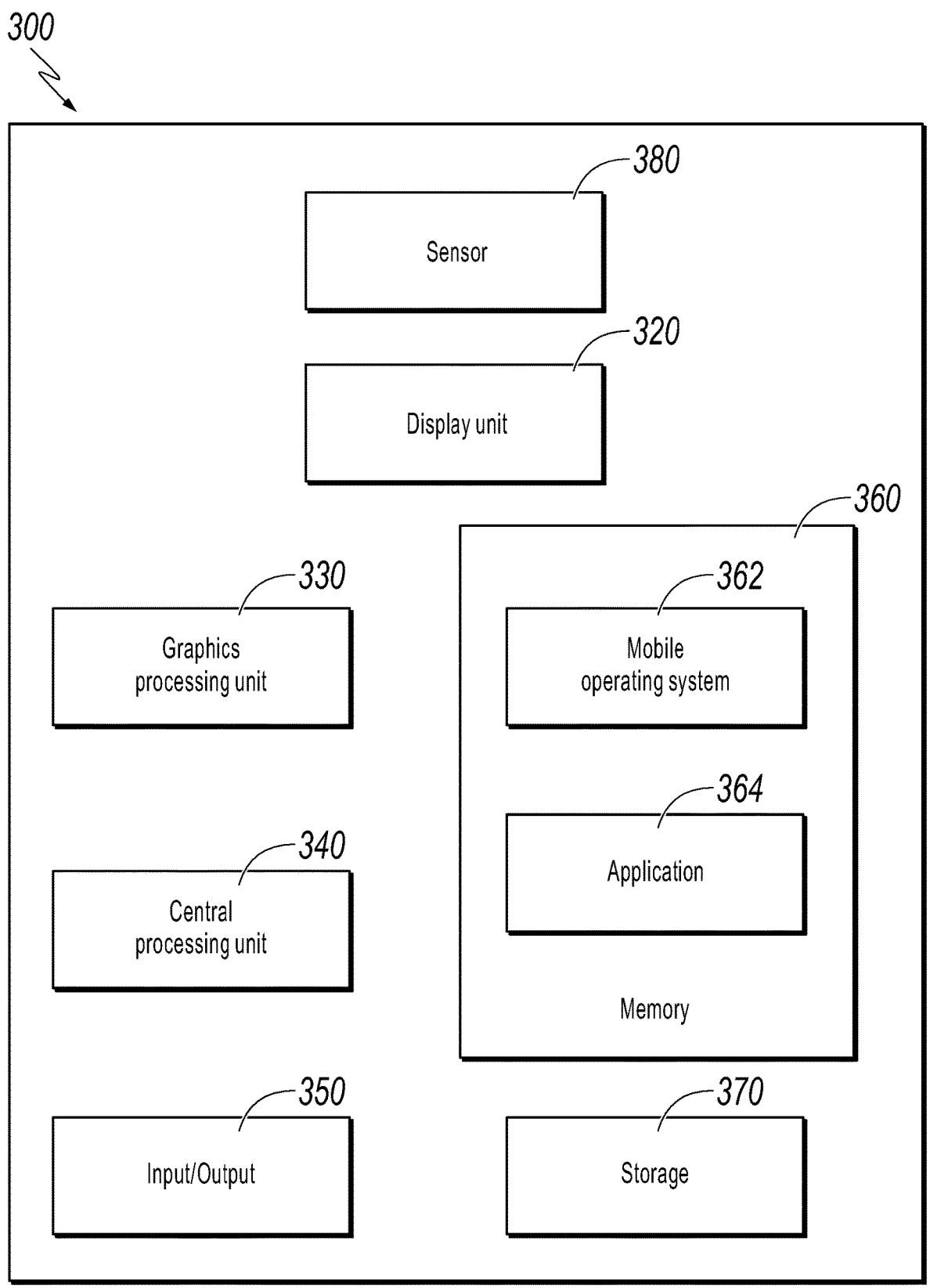
FIG. 3 is a schematic diagram illustrating an example end-user device, according to some implementations of the present specification.

FIG. 3 is a schematic diagram illustrating an example end-user device, according to some implementations of the present specification. As shown in FIG. 3, the end-user device 300 can include a communications unit 310, a display unit 320, a GPU 330, a CPU 340, an input/output unit 350, a memory 360, a storage 370, and one or more sensors 380. In some implementations, the memory 360 can further include a mobile operating system 362 and an application 364. In some implementations, any other suitable component, including but not limited to a system bus or a controller (not shown), can also be included in the end-user device 300.

In some implementations, the mobile operating system 362 (e.g., iOS™, Android™, or Windows Phone) and one or more applications 364 can be downloaded from the storage 370 to the memory 360 for execution by the CPU 340. In some implementations, the application 364 can be any suitable transaction payment mobile application for obtaining at least one of information and data related to code scanning payment or other information from the system 100 for determining a recommended region. The input/output unit 350 can implement exchange of data information with the system 100 for determining a recommended region, and provide interaction-related information to another component, for example, the processing device 110, in the system 100 for determining a recommended region through the network 140. In some implementations, the sensor 380 can be a camera, and is configured to scan a transaction code. In some implementations, the sensor 380 can scan a transaction code, to generate payment transaction data related to transaction code scanning. Further, the processing device 110 can implement the example method in the present specification by executing or using the data.

To implement various modules, units, and functions of the modules and the units described in the present specification, a computer hardware platform can be used as a hardware platform of one or more elements described here. A computer with a user interface element can be configured to implement a personal computer (PC) or any other form of workstation or terminal device. A computer can also serve as a server through suitable programming.

Figure 4:
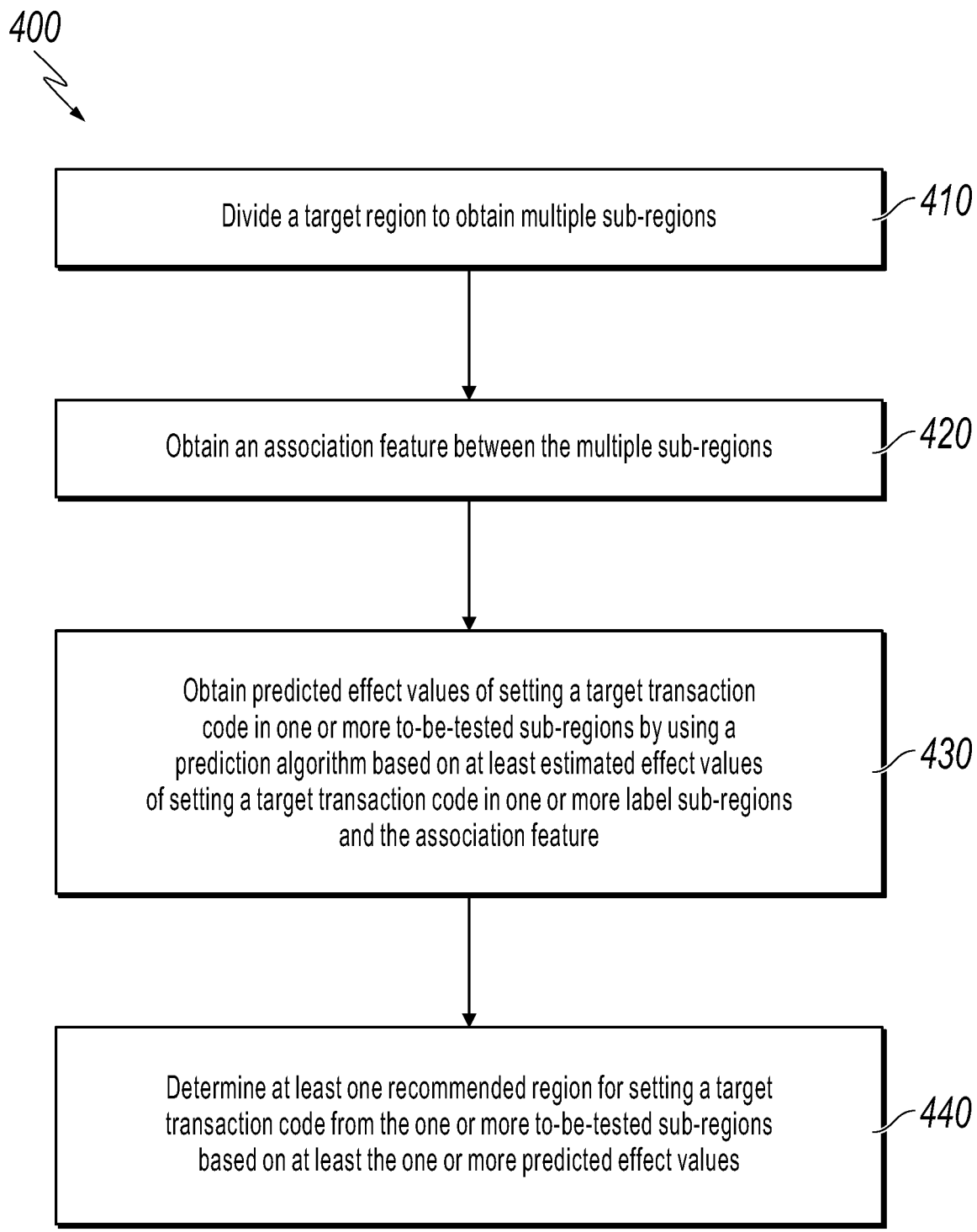
FIG. 4 is an example flowchart illustrating determining a recommended region for setting a target transaction code, according to some implementations of the present specification.

FIG. 4 is an example flowchart illustrating determining a recommended region for setting a target transaction code, according to some implementations of the present specification. In some implementations, one or more steps in a process 400 can be implemented in the system 100 shown in FIG. 1. For example, one or more steps in the process 400 can be stored in at least one of the storage device 120 and the storage 220 as instructions, and the instructions are invoked and/or executed by at least one of the processing device 110 and the processor 210.

410: Divide a target region to obtain multiple sub-regions. 410 can be performed by a division module 710.

Figure 8:
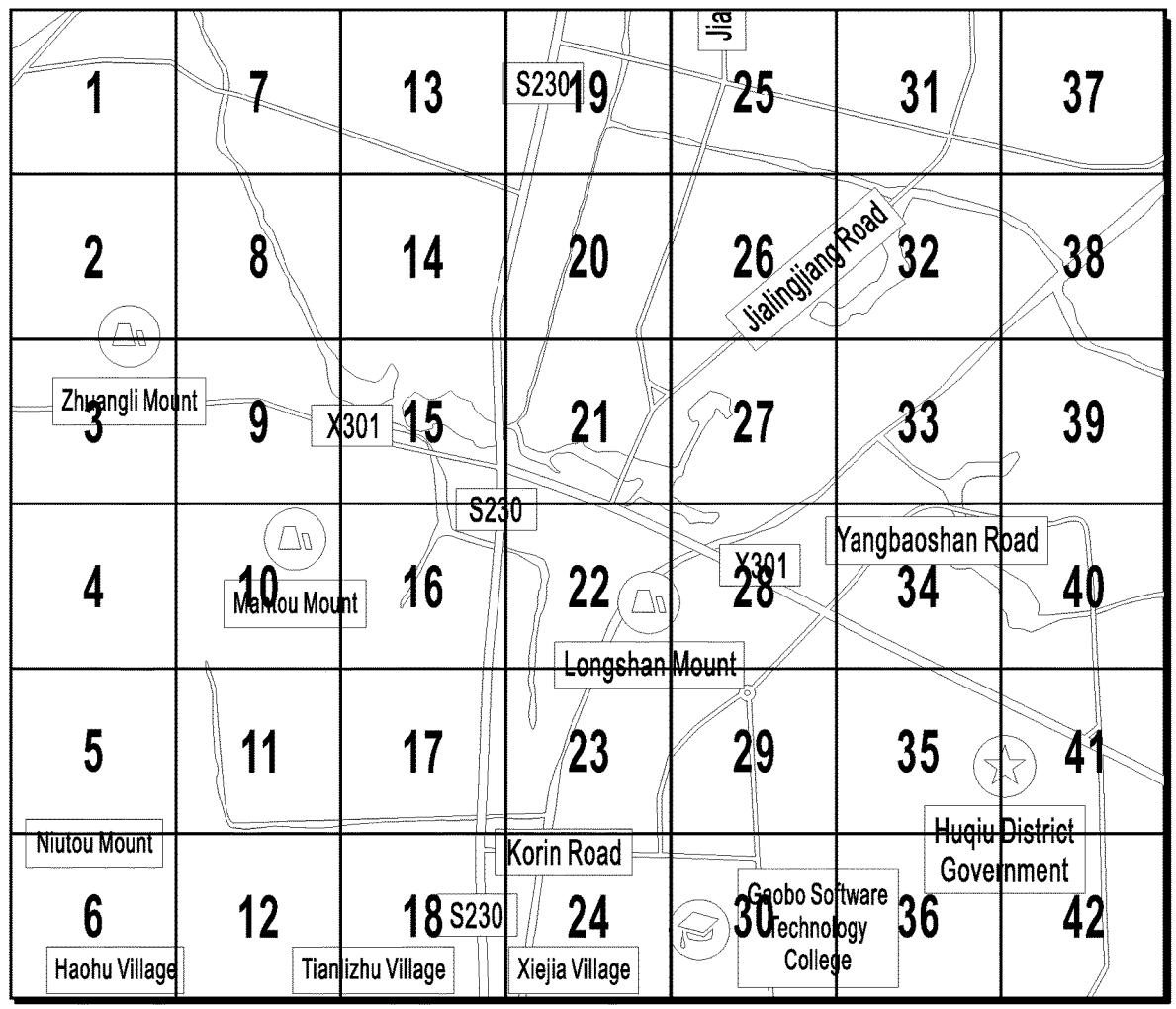
FIG. 8 is an example schematic diagram illustrating a result of dividing a target region, according to some implementations of the present specification.

In some implementations, the target region can be a potential region where a transaction code needs to be set. For example, the target region can include an administrative region (for example, a province, a city, an autonomous region, an autonomous prefecture, a municipality, a municipal district, or a county), a country, a continent, or the world. The target region can be divided based on a GeoHash algorithm. The GeoHash algorithm is an algorithm for encoding a geographical location. The basic principle of the GeoHash algorithm is that the earth is understood as a two-dimensional plane, the plane is recursively divided into multiple small sub-blocks, and each sub-block can be encoded into a character string of a certain length. FIG. 8 is an example schematic diagram illustrating a result of dividing a target region, according to some implementations of the present specification. As shown in FIG. 8, after GeoHash calculation is performed on a target region in the figure, the target region is divided into a combination of multiple square grids (the region shown in FIG. 8 is divided into 42 grids). The 42 grids can be referred to as sub-regions of the target region. Each sub-region can correspond to one GeoHash character string, in other words, 42 character strings represent 42 square grids. The GeoHash algorithm can convert a two-dimensional latitude and longitude range into a character string. For example, a region is encoded by using a base32 encoding scheme. For example, a region where a location (latitude and longitude coordinates: E116.414597°, N39.955441°) near the Anding Gate in Beijing is located is calculated by using the GeoHash algorithm, to obtain a code WX4G2. Different codes represent different ranges, and the range is more accurate if a character string obtained is longer. If character strings of two or more regions are similar, the two or more regions are close; or vice versa. For example, region 1, region 2, region 7, and region 8 shown in FIG. 8 are close, and character strings obtained are similar.

In some implementations, the target region can be divided based on another method. By way of example only, the target region can be divided into multiple sub-regions of any shape, for example, a triangle, a rectangle, a diamond, a hexagon, or a circle. Shapes of the sub-regions obtained can be the same or different. Still for example, the target region can be divided based on a map corresponding to the target region. For example, the target region is divided into multiple sub-regions along a road drawing division line. It can be understood that the target region can be divided by using any method, and methods are not limited in the implementations of the present specification.

In some implementations, the target region can include one or more label sub-regions with known target transaction code setting effects and one or more to-be-tested sub-regions with unknown target transaction code setting effects. The label sub-region can be a sub-region, with a setting effect satisfying a specific condition, where a target transaction code has been set. The to-be-tested sub-region can be a candidate sub-region where a target transaction code can be set. The setting effect can be impact on offline network payment transactions after a target transaction code is set. For example, after a target transaction code is set in a region or a store, users can consume with greater convenience, it takes less time to conduct a transaction in the store, more users conduct transactions using offline network payment. In this case, positive impact is generated after the transaction code is set. In some implementations, the setting effect can be represented by using an estimated effect value. The larger the estimated effect value, the more positive the effect of setting a target transaction code is. The estimated effect value can be determined based on target transaction code usage data. For example, the estimated effect value is determined based on a quantity of users and a quantity of stores conducting offline network payment transactions, etc. For determining the effect of setting a target transaction code, references can be made to other parts (e.g., FIG. 5) of the present specification. Details are omitted here for simplicity.

420: Obtain an association feature between the multiple sub-regions. 420 can be performed by an acquisition module 720.

In some implementations, the acquisition module 720 can obtain association data between the multiple sub-regions, and determine the association feature between the multiple sub-regions based on the association data. The association data can be data that is shared between sub-regions and represents an association relationship between the two sub-regions. In some implementations, the association data can reflect an economic or geographical association relationship, for example, a similarity or dependence, between the two sub-regions. The economic association relationship includes but is not limited to a consumption structure, a consumption level, an industry type, a pillar generation force, etc. The geographical association relationship can include but is not limited to a traffic situation, a geographical structure similarity, a commercial circle distribution similarity, etc. By way of example only, the association data can be a quantity of common users involved in offline network payment transactions within a period of time, or can be a proximity relationship (e.g., a distance) between same or similar traffic stations such as subway stations between sub-regions, a similarity of consumption places between sub-regions (e.g., a proportion of a same type of stores in all stores in a region). In some implementations, the association data can include at least one second quantity. The second quantity can be a quantity of common users conducting offline network payment transactions in two sub-regions within a first predetermined time period. For example, user a conducts an offline network payment transaction in a certain store in sub-region A, and also conducts an offline network payment transaction in a certain store in sub-region B within the first predetermined time period. In this case, user a can be considered as a common user of sub-region A and sub-region B. The first predetermined time period can be a time parameter predetermined in the system 100, for example, one day, one week, one month, one quarter, half a year, or one year, or can be adjusted at any time based on an actual operating time. The first predetermined time period can be a time period before the technical solutions disclosed in the present specification are executed. In some implementations, the first predetermined time period can be one month. In some implementations, the acquisition module 720 can communicate with at least one of the end-user device 130 and the storage device 120 to obtain the association data. For example, the end-user device 130 can obtain operation content such as offline network payment data of a user on the end-user device 130. The acquisition module 720 can obtain data after communicating with the end-user device 130. Still for example, the acquisition module 720 can access and read historical offline network transaction data stored in the end-user device 130 or the storage device 120.

Figure 9:
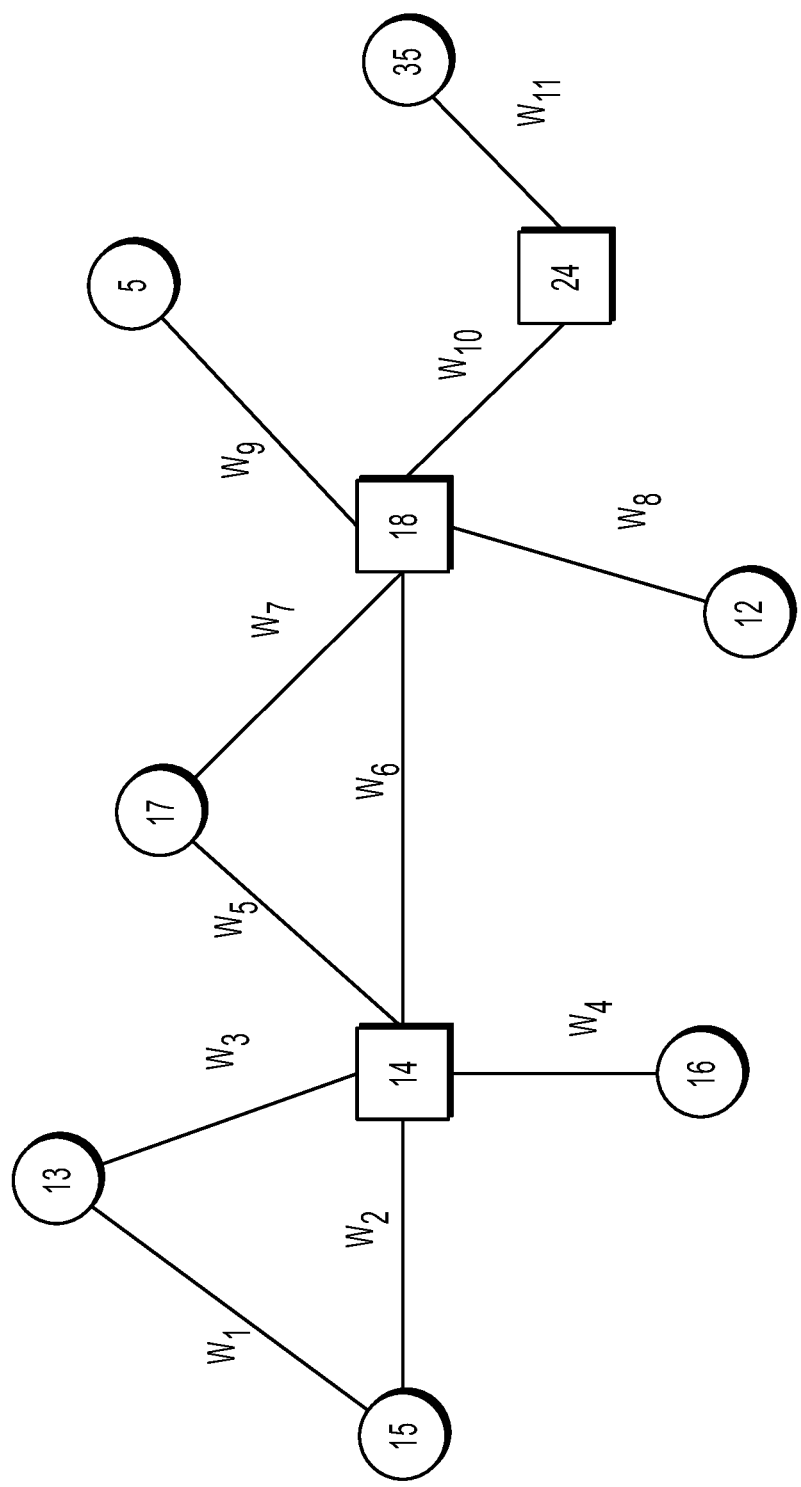
FIG. 9 is a schematic diagram illustrating an example association map, according to some implementations of the present specification.

In some implementations, the association feature can be information used to represent an association relationship between two sub-regions. The association feature can be constructed based on the association data obtained. In some implementations, the acquisition module 720 can determine whether each of the at least one second quantity is greater than a first predetermined threshold. The first predetermined threshold can be a default value of the processing device 110, or can be adjusted based on different situations. The first predetermined threshold is not limited in the implementations of the present specification. If the second quantity is greater than the first predetermined threshold, the acquisition module 720 can determine that there is an association relationship between two sub-regions corresponding to the second quantity. Otherwise, there is no association relationship between two sub-regions corresponding to the second quantity. After the previous operation is performed on each second quantity, the acquisition module 720 can construct an association map based on processing results (e.g., whether there is an association relationship between two sub-regions) and use the association map as the association feature between the multiple sub-regions. For example, the acquisition module 720 can use a node to represent a sub-region and a line to represent an association relationship. If there is a line connecting two nodes, there is an association relationship between the two nodes. A graphic consisting of nodes and lines can be considered as the association map. FIG. 9 is a schematic diagram illustrating an example association map, according to some implementations of the present specification. As shown in FIG. 9, a node represents a sub-region, and a line between nodes represents an association relationship between sub-regions. Nodes of different shapes can represent sub-regions of different types. For example, circular nodes can be used to represent the to-be-tested sub-regions (e.g., 13, 15, 16, 17, 12, 5, and 35), and square nodes can be used to represent the label sub-regions (e.g., 14, 18, and 24). A number in a node can be used to indicate a number of a sub-region. If there is no line connecting two nodes, there is no association relationship between the two nodes.

In some implementations, after determining, based on the second quantity, that there is an association relationship between the two sub-regions corresponding to the second quantity, the acquisition module 720 can further determine association strength between the two sub-regions. The association strength can be used to indicate a degree of intimacy of the association relationship between the two sub-regions. Greater association strength indicates a closer association relationship between the two sub-regions and a higher similarity between the two sub-regions. In some implementations, the association strength is positively correlated with the second quantity. For example, the association strength between the two sub-regions can be calculated by using formula (1):

$$w = k(X - T) \tag{1}$$

Here, w represents the association strength between the sub-regions, X represents the second quantity, T represents the first predetermined threshold, and k represents a positive correlation coefficient, for example, is a real number greater than 0. After determining the association strength between the associated sub-regions, the acquisition module 720 can further construct the association map based on a processing result (e.g., the association strength between the sub-regions), and use the association map constructed twice as the association feature between the multiple sub-regions. Referring back to FIG. 9, a thickness of a line between nodes can indicate strength of an association relationship between sub-regions. A thicker line indicates a stronger association relationship between two sub-regions. For example, a line between sub-region 18 and sub-region 12 is thicker than a line between sub-region 18 and sub-region 17, and therefore, an association relationship between sub-region 18 and sub-region 12 is stronger than an association relationship between sub-region 18 and sub-region 17. Or, a value, namely, w (e.g., from $w_1$ to $w_{11}$), used to indicate strength of an association relationship can be marked on a line between nodes, to intuitively indicate association strength between the nodes.

In some implementations, the association map can be updated. The acquisition module 720 can re-obtain association data between sub-regions at intervals, and re-compute an association relationship and association strength between the sub-regions based on the association data newly obtained, to update line thicknesses in the association map. The acquisition module 720 can further estimate a setting effect of a recommended region after determining the to-be-tested sub-region as a recommended region and setting a target transaction code in the region, update a recommended region that satisfies a condition to a label sub-region, and update a node corresponding to the recommended region on the association map. For the update of the association map, references can be made to other parts (e.g., FIG. 6) of the present specification. Details are omitted here for simplicity.

430: Obtain predicted effect values of setting a target transaction code in the one or more to-be-tested sub-regions by using a prediction algorithm based on at least estimated effect values of setting a target transaction code in the one or more label sub-regions and the association feature. 430 can be performed by a determining module 730.

In some implementations, the predicted effect value can be a predicted value that may be generated in the future after a target transaction code is set in the to-be-tested sub-region to indicate an estimated effect value of a setting effect. The prediction algorithm can be a graph propagation algorithm. The determining module 730 can obtain the predicted effect values of setting a target transaction code in the one or more to-be-tested sub-regions by using the graph propagation algorithm based on the association feature and the estimated effect values of the one or more label sub-regions. For example, the graph propagation algorithm can be a PageRank algorithm, a hyperlink induced topic search (HITS) algorithm, a Weisfeiler-Lehman algorithm, a label propagation algorithm (LPA), etc., or a combination thereof. The following uses the LPA as an example merely for the purpose of description, to describe determining of the predicted effect values of setting a target transaction code in the one or more to-be-tested sub-regions. During calculation based on the LPA, probability transition matrix P of n×n can be first determined. Probability transition matrix P can be represented as follows:

$$P_{ij} = P(i \to j) = \frac{w_{ij}}{\sum_{k=1}^{n} w_{ik}}$$

Here, $P_{ij}$ represents a probability of transition from node i to node j and also represents a weight of impact of node i on node j, $w_{ij}$ represents an edge weight between node i and node j, and n represents a total number of nodes. In the present specification, n can represent a quantity of all sub-regions. $w_{ij}$ can be calculated by using the following formula:

$$w_{ij} = \exp\left(-\frac{d_{ij}}{\alpha^2}\right)$$

Here, $d_{ij}$ represents a Euclidean distance between two nodes, and α represents a hyperparameter and can be adjusted based on different scenarios. After probability transition matrix P is determined, another label matrix T of n×m can be determined. Here, m represents a quantity of labeled nodes. In the present specification, m can represent a quantity of label sub-regions. Element $T_{ij}$ in label matrix T represents a probability from node i to node j. The ith row in label matrix T can represent a probability from node i to each labeled node. If node i is a labeled node (e.g., a label sub-region with a known estimated effect value), a probability from node i to node i is 1, and a probability from node i to another labeled node is 0. If node i is an unlabeled node (e.g., a to-be-tested sub-region whose predicted effect value needs to be calculated), any value can be assigned to the probability from unlabeled node i to each labeled node before label matrix T is used for calculation, provided that the sum of probabilities is equal to 1. The previous two matrices are determined in no order, and can be simultaneously determined. After the two matrices are determined, probability distribution of labeled nodes in label matrix T remains unchanged, and probability distribution of unlabeled nodes is updated. The update can be performed by using the following formula:

$$T_{ij} = \sum_{k=1}^{n-m} P_{kj} \times T_{kj}$$

The previous calculation is repeated until label matrix T converges. Afterward, values in label matrix T can represent a probability from unlabeled node i to each labeled node, namely, a predicted effect value of a to-be-tested sub-region.

In some implementations, the prediction algorithm can be an algorithm similar to weighted summation. The determining module 730 can determine a label sub-region associated with a to-be-tested sub-region based on the association map, and determine an estimated effect value of setting a target transaction code in the to-be-tested sub-region based on an estimated effect value of the label sub-region and association strength associated with the to-be-tested sub-region. Referring back to FIG. 9, nodes 14, 18, and 24 shown in FIG. 9 are label sub-regions where a target transaction code has been set, and nodes 13, 15, 16, 17, 12, 5, and 35 are to-be-tested sub-regions. Using node 17 as an example, label sub-regions associated with node 17 include node 14 and node 18. Assume that estimated effect values of node 14 and node 18 are $E_a$ and $E_b$ respectively. With reference to FIG. 9, association strength between node 14 and node 17 and association strength between node 18 and node 17 are $w_5$ and $w_7$ respectively. In this case, predicted effect value of node 17 can be determined by using formula (2):

$$E_c = m * E_a \times \frac{w_5}{w_5 + w_7} + n * E_b \times \frac{w_7}{w_5 + w_7} = \frac{E_a \times w_5 + E_b \times W_7}{w_5 + w_7} \quad (2)$$

Here, m and n represent weight values, and can be determined in advance, or can be adjusted based on different situations. In some implementations, the weight values can be 1, which means that an estimated effect value of a label sub-region is transferred to a to-be-tested sub-region only based on association strength associated with the to-be-tested sub-region. The higher the association strength, the more estimated effect values are transferred, or vice versa.

440: Determine at least one recommended region for setting a target transaction code from the one or more to-be-tested sub-regions based on at least the one or more predicted effect values. 440 can be performed by the determining module 730.

In some implementations, the recommended region can be a region where positive benefits are brought after a target transaction code is set. For example, users can consume with greater convenience, or it takes less time to conduct a transaction in a store. The determining module 730 can compare a predicted effect value of a to-be-tested sub-region with a second predetermined threshold, and determine whether to use the to-be-tested sub-region as the recommended region based on a comparison result. The second predetermined threshold can be a default value of the processing device 110, or can be adjusted based on different situations. The second predetermined threshold is not limited in the implementations of the present specification. If the predicted effect value is greater than the second predetermined threshold, the determining module 730 can determine the to-be-tested sub-region where no target transaction code has been set as a recommended region for setting a target transaction code. Otherwise, the to-be-tested sub-region, where no target transaction code has been set, corresponding to the predicted effect value is not used as a recommended region for setting a target transaction code.

In some implementations, the determining module 730 can further perform screening based on feature data of the to-be-tested sub-region, and determine whether to use the to-be-tested sub-region as the recommended region based on a screening result and the comparison result of the predicted effect value. The feature data can include data related to transactions in the to-be-tested sub-region, including but not limited to a third quantity of users conducting offline network payment transactions within a second predetermined time period in the to-be-tested sub-region, a fourth quantity of merchants conducting offline network payment transactions within the second predetermined time period in the to-be-tested sub-region, a third ratio of the quantity of merchants conducting offline network payment transactions within the second predetermined time period in the to-be-tested sub-region to a total quantity of merchants in the to-be-tested sub-region, and a type of a point of interest corresponding to the to-be-tested sub-region. The second predetermined time period can be a time parameter predetermined in the system 100, for example, one day, one week, one month, one quarter, half a year, or one year, or can be adjusted at any time based on an actual operating time. In some implementations, the second predetermined time period can be one month. The second predetermined time period can be a time period before the technical solutions disclosed in the present specification are executed. For convenience, the following describes the third quantity, the fourth quantity, the third ratio, and the point of interest by using an example. Assume that there are 100 merchants in to-be-tested sub-region A, and the to-be-tested sub-region including a shopping center that occupies more than 80% of the geographical area of the to-be-tested sub-region. In one month, 1000 customers consume in these merchants. 600 of the 1000 customers consume in 70 merchants through offline network payment transactions. The other 400 customers and 30 merchants use non-online network payment transactions such as cash and credit cards to complete final consumption. Therefore, the third quantity can be 600, the fourth quantity can be 70, the third ratio can be 0.7 (70/100), and the type of the point of interest corresponding to the to-be-tested sub-region can be a shopping center. When a to-be-tested sub-region includes multiple types of functional regions, for example, a scenic spot or a traffic station (e.g., a railway station or a bus station), a type of a point of interest corresponding to the to-be-tested sub-region can be a scenic spot or a traffic station. When there are multiple functional regions in a to-be-tested sub-region, there can be multiple types of points of interest corresponding to the to-be-tested sub-region, or a functional region associated with offline network payment transactions most strongly can be selected as a type of a point of interest corresponding to the to-be-tested sub-region from the multiple functional regions. For example, if a to-be-tested sub-region includes multiple functional regions such as a shopping center, a railway station, and a scenic spot, and a functional region associated with offline network payment transactions most strongly is the shopping center (e.g., more than 60% offline network payment transactions in the sub-region are generated in the functional region), a type of a point of interest corresponding to the to-be-tested sub-region can be a shopping center. The feature data can be stored in any device with a storage function, for example, the end-user device 130, the storage device 120, or the storage 220. The determining module 730 can communicate with or be directly connected to these devices through the network 140 to obtain the feature data.

In some implementations, the determining module 730 can further obtain a predetermined condition corresponding to the feature data. The predetermined condition can be used to determine whether the to-be-tested sub-region can be used as a potential recommended region for setting a target transaction code. The predetermined condition can include the following: The third quantity is greater than a third predetermined threshold, the fourth quantity is greater than a fourth predetermined threshold, the third ratio is greater than a fifth predetermined threshold, and the point of interest is the same as at least one predetermined point of interest, or a combination thereof. The predetermined thresholds (including the third predetermined threshold, the fourth predetermined threshold, and the fifth predetermined threshold) can be default values of the processing device 110, or can be adjusted based on different situations. The predetermined thresholds are not limited in the implementations of the present specification. Similarly, the predetermined point of interest can be determined in advance, or can be adjusted based on situations. After obtaining the feature data and the predetermined condition corresponding to the feature data, the determining module 730 can determine whether the predicted effect value of the to-be-tested sub-region is greater than the second predetermined threshold and whether at least one type of feature data satisfies the predetermined condition. If the predicted effect value is greater than the second predetermined threshold and the at least one type of feature data satisfies the predetermined condition, the determining module 730 can determine the to-be-tested sub-region as a recommended region for setting a target transaction code. Otherwise, the to-be-tested sub-region is not used as a recommended region for setting a target transaction code.

In some implementations, after the at least one recommended region for setting a target transaction code is determined, if there are more than two recommended regions, the processing device 110 can determine whether the recommended regions are adjacent during division. That the recommended regions are adjacent can mean that to-be-tested sub-regions corresponding to the recommended regions have a same boundary line during division of the target region, for example, a division line used to divide the target region. If there are adjacent recommended regions, the processing device 110 can combine the adjacent recommended regions to obtain a new recommended region.

It is worthwhile to note that the previous description of the process 400 is merely for example and description, and does not limit the application scope of the present specification. A person skilled in the art can make various modifications and changes to the process 400 under the guidance of the present specification. However, these modifications and changes still fall within the scope of the present specification. For example, 420 can be further divided into 420-1 and 420-2. In 420-1, association data between the multiple sub-regions can be obtained. In 420-2, an association feature between the multiple sub-regions can be determined based on the association data. Still for example, one or more other optional steps (e.g., a storage step or a preprocessing step) can be added elsewhere in the method 400. Still for example, all steps in the method 400 can be implemented in a computer-readable medium including a set of instructions. The instructions can be transmitted in the form of an electronic current or an electrical signal.

In the technical solutions disclosed in the present specification, whether setting a target transaction code is proper can be analyzed for multi-dimensional data generated in each region (e.g., any region worldwide) through big data, which is more efficient, comprehensive, and objective than offline manual investigation. In addition, during a region analysis, a region is evaluated by using multiple features including a population concentration, for example, population conversion, a store feature, a region feature, and a time feature, so that selection accuracy of a setting region is higher. In addition, a known setting region is labeled by using a setting effect of the known region, and a recommended region for setting with a similar effect is obtained by using a relationship between regions, namely, a similarity, so that the recommended region can obtain a better setting effect.

Figure 5:
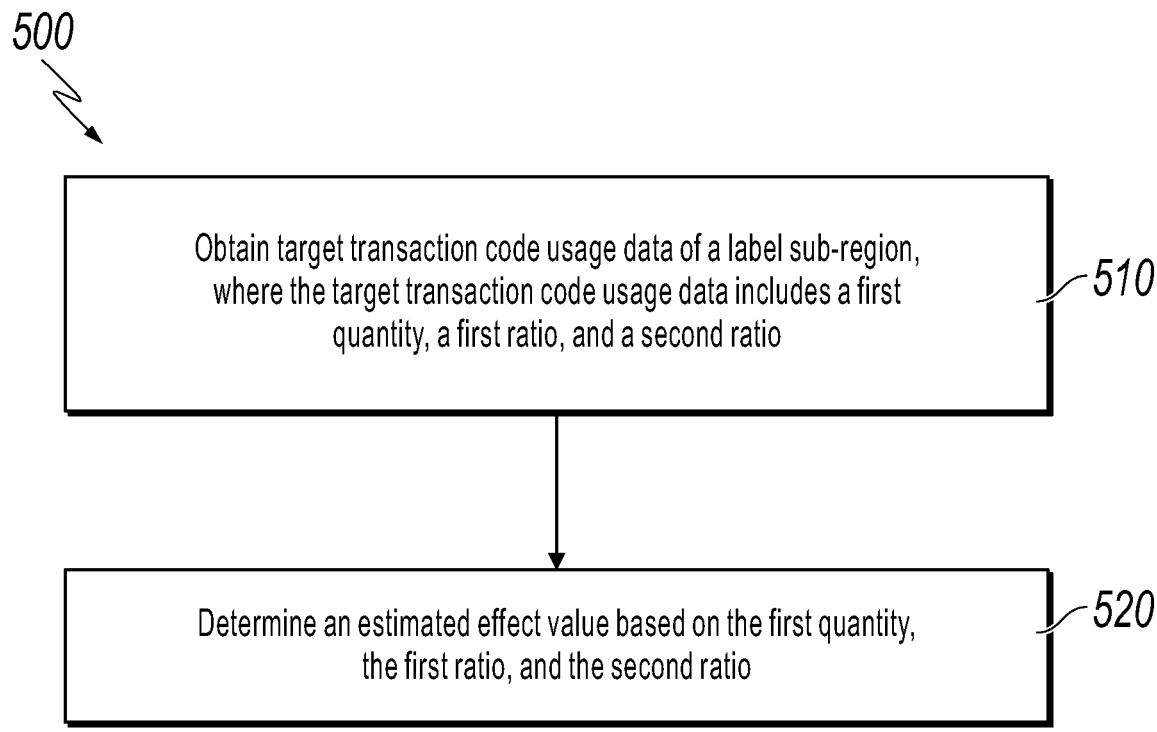
FIG. 5 is an example flowchart illustrating determining an estimated effect value of setting a transaction code in a label sub-region, according to some implementations of the present specification.

FIG. 5 is an example flowchart illustrating determining an estimated effect value of setting a target transaction code in a label sub-region, according to some implementations of the present specification. In some implementations, one or more steps in a process 500 can be implemented in the system 100 shown in FIG. 1. For example, one or more steps in the process 500 can be stored in at least one of the storage device 120 and the storage 220 as instructions, and the instructions are invoked and/or executed by at least one of the processing device 110 and the processor 210. In some implementations, the method 500 can be performed by the determining module 730.

510: Obtain target transaction code usage data of the label sub-region.

In some implementations, the target transaction code usage data can include a first quantity of merchants conducting offline network payment transactions using a target transaction code in the label sub-region, a first ratio of a quantity of offline network payment transactions using a target transaction code to a total quantity of transactions for each of the merchants of the first quantity in the sub-region, and a second ratio of a quantity of users conducting offline network payment transactions using a target transaction code to a total quantity of users in the label sub-region. Conducting an offline network payment transaction using a target transaction code can mean completing a transaction based on a transaction window obtained after the end-user device 130 performs a code scanning operation on the target transaction code, or deducting a part of consumption amount by using a virtual product such as a red packet obtained through code scanning in offline network payment. The total quantity of transactions can be a quantity of transactions achieved through offline network payment transaction, including offline network payment transactions using a target transaction code and offline network payment transactions without using a target transaction code, for example, an Internet transfer. The total quantity of transactions can be a total quantity of transactions in the region, including transactions achieved through offline network payment transaction and transactions completed only offline. For convenience, the following describes the first quantity, the second ratio, and the first ratio by using an example. Assume that there are 50 merchants in the label sub-region, and 500 users conduct transactions in these merchants in one month. 400 users use a target transaction code to conduct offline network payment transactions in 30 merchants. Transactions related to the other 100 users and the other 20 merchants are offline network payment transactions without using a target transaction code, for example, an Internet transfer, or non-offline network payment transactions, for example, cash payment. Among the 30 merchants, network payment transactions using a target transaction code (e.g., b offline network payment transactions are conducted by using a target transaction code) occupy a part of transactions achieved by a certain merchant (e.g., a transactions are achieved). Therefore, the first quantity can be 30, the first ratio can include a/b, and the second ratio can be 0.8 (400/500). The target transaction code usage data can be stored in any device with a storage function, for example, the end-user device 130, the storage device 120, or the storage 220. The determining module 730 can communicate with or be directly connected to these devices through the network 140 to obtain the target transaction code usage data.

520: Determine the estimated effect value based on the first quantity, the first ratio, and the second ratio.

It can be understood that, using a target transaction code by a user and a merchant as participants in a transaction affects an effect of setting a target transaction code in the region. If more users and merchants conduct more offline network payment transactions using a target transaction code, it can be considered that the target transaction code produces a positive setting effect in the region.

In some implementations, the estimated effect value can be calculated by using formula (3):

$$R = p * \sum_{k=0}^{n} \binom{n}{k} r_k + q * u_1 \qquad (3)$$

Here, n represents the first quantity of merchants conducting offline network payment transactions using a target transaction code, k represents the kth merchant, $r_k$ represents a first ratio of a quantity of offline network payment transactions using a target transaction code to a total quantity of transactions for the kth merchant in the label sub-region, $u_1$ represents a second ratio of a quantity of users conducting offline network payment transactions using a target transaction code to a total quantity of users in the label sub-region, p and q represent weights, and the sum of p and q is equal to 1. In some implementations, 0.5 can be assigned to each of p and q. It can be understood that, as participants in a transaction, a user and a merchant jointly affect an effect of setting a target transaction code in the region. Therefore, during determining of R, the same value or different values are assigned to weights for a user and a merchant after overall consideration of impact of the two parties.

It is worthwhile to note that the previous description of the process 500 is merely for example and description, and does not limit the application scope of the present specification. A person skilled in the art can make various modifications and changes to the process 500 under the guidance of the present specification. However, these modifications and changes still fall within the scope of the present specification.

Figure 6:
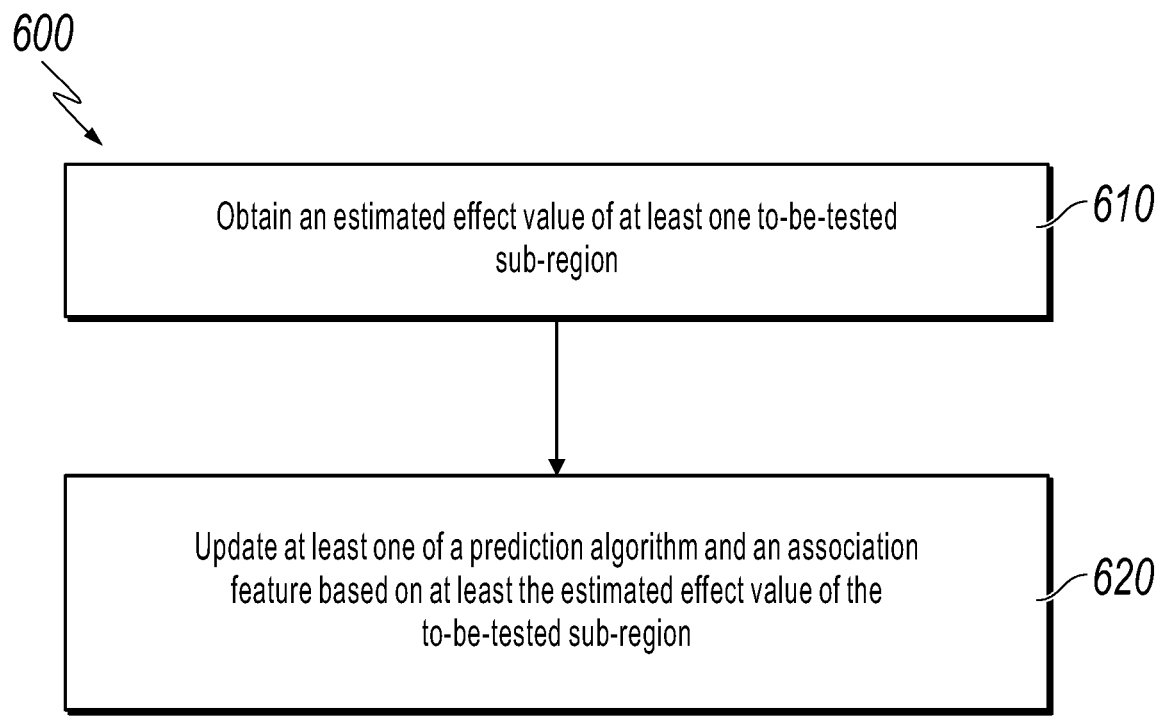
FIG. 6 is an example flowchart illustrating updating at least one of a prediction algorithm and an association feature, according to some implementations of the present specification.

FIG. 6 is an example flowchart illustrating updating at least one of a prediction algorithm and an association feature, according to some implementations of the present specification. In some implementations, one or more steps in a process 600 can be implemented in the system 100 shown in FIG. 1. For example, one or more steps in the process 600 can be stored in at least one of the storage device 120 and the storage 220 as instructions, and the instructions are invoked and/or executed by at least one of the processing device 110 and the processor 210. In some implementations, the method 600 can be performed by an update module 740.

610: obtain an estimated effect value of at least one to-be-tested sub-region.

In some implementations, the estimated effect value of the to-be-tested sub-region can be an estimated effect value after the to-be-tested sub-region is used as a recommended region and a target transaction code has been set for a period of time (e.g., one week, two weeks, one month, or two months). A method for obtaining the estimated effect value can be the same as the method disclosed in FIG. 5. Details are omitted here for simplicity. The update module 740 can communicate with other components of the processing device 110 to obtain the estimated effect value of the at least one to-be-tested sub-region.

620: Update at least one of the prediction algorithm and the association feature based on at least the estimated effect value of the to-be-tested sub-region.

In some implementations, the update module 740 can determine a difference between the estimated effect value and a predicted effect value of the to-be-tested sub-region. The predicted effect value of the to-be-tested sub-region can be determined during determining of a recommended region. The difference can be a difference between the estimated effect value and the predicted effect value. The update module 740 can update at least one of the prediction algorithm and the association feature based on the difference. For example, the update module 740 can compare the difference with a predetermined threshold. The predetermined threshold can be a predetermined value of the processing device 110, or can be adjusted based on different situations. If the difference is less than the detection threshold, the update module 740 maintains at least one of the original prediction algorithm and the original association feature for determining a recommended region next time. If the difference exceeds the detection threshold, it indicates that precision or accuracy of at least one of the prediction algorithm and the association feature does not satisfy a requirement in the process of determining the predicted effect value. The update module 740 can update at least one of the prediction algorithm and the association feature to improve prediction precision. Updating the prediction algorithm can include updating a graph propagation algorithm (e.g., updating an LPA to a GoodDeep algorithm), adjusting algorithm parameters (e.g., updating parameters such as weight values in formula (1), formula (2), and formula (3)), or a combination thereof. Updating the association feature can include updating a parameter in a formula for calculating association strength, updating a parameter in a formula for calculating a predicted effect value, updating a line between nodes in an association map, or a combination thereof. In particular, the update module 740 can update a to-be-tested sub-region whose estimated effect value is greater than the predetermined threshold to a label sub-region, and update a node corresponding to the to-be-tested sub-region in the association map. By way of example only, referring to FIG. 9, assume that a to-be-tested sub-region corresponding to node 15 is determined as a recommended region, and an estimated effect value of the to-be-tested sub-region is greater than the predetermined threshold. In this case, the update module 740 can update a circular node representing the to-be-tested sub-region to a square node. In addition, the update module 740 can further update an algorithm for a predicted effect value of a to-be-tested sub-region corresponding to another node connected to node 15.

It is worthwhile to note that the previous description of the process 600 is merely for example and description, and does not limit the application scope of the present specification. A person skilled in the art can make various modifications and changes to the process 600 under the guidance of the present specification. However, these modifications and changes still fall within the scope of the present specification.

In the solutions disclosed in the present specification, after a recommended region is determined, an effect of setting a target transaction code in the recommended region can be monitored, and an existing recommendation solution is updated based on the setting effect, so that the solutions can be self-optimized. As time passes by, accuracy of the solutions is higher, and the setting effect of the recommended region obtained is also better.

Figure 7:
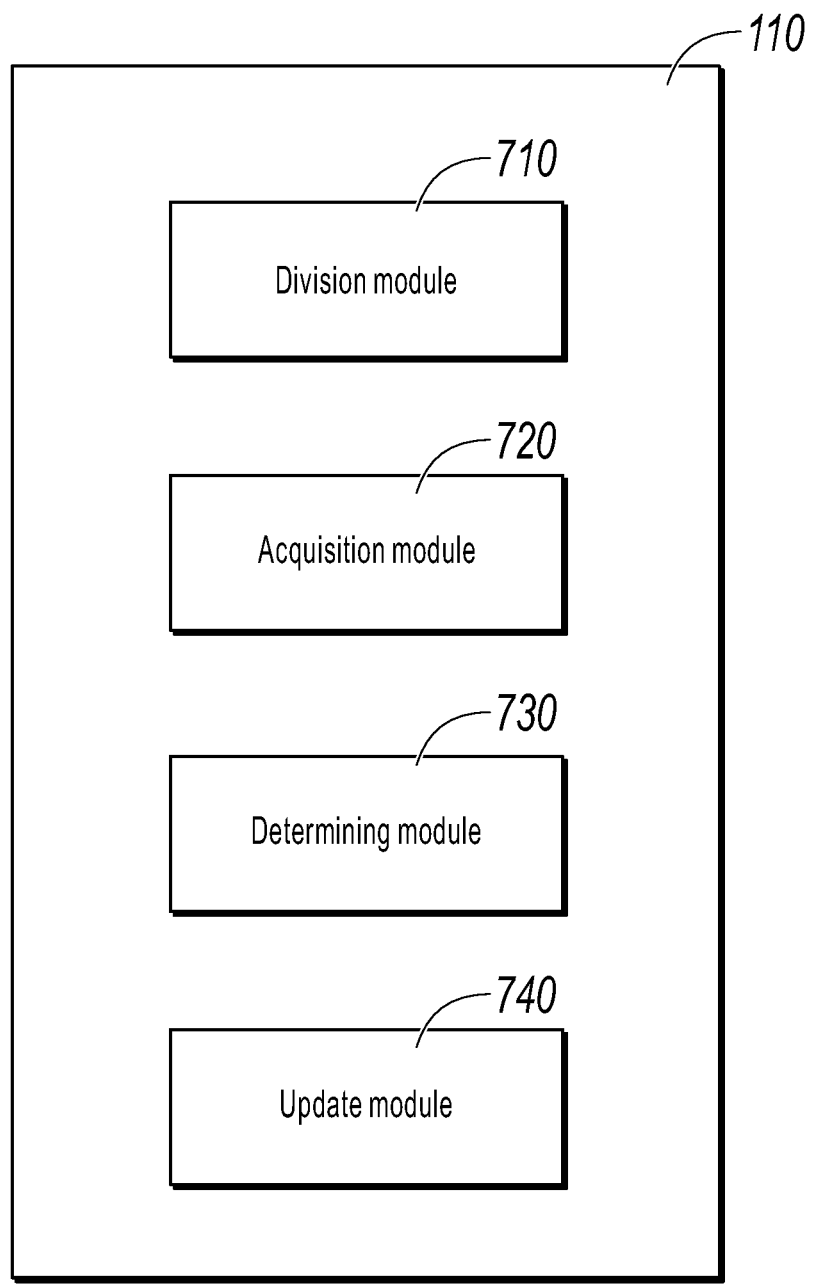
FIG. 7 is a block diagram illustrating an example processing device 110, according to some implementations of the present specification.

FIG. 7 is a block diagram illustrating an example processing device 110, according to some implementations of the present specification. The processing device 110 can obtain transaction data and association data related to multiple sub-regions, and determine a recommended region for setting a target transaction code based on the data obtained. As shown in FIG. 7, the processing device 110 can include a division module 710, an acquisition module 720, a determining module 730, and an update module 740.

The division module 710 can divide a target region. In some implementations, the target region can be a potential region where a transaction code needs to be set, and can include one or more label sub-regions with known target transaction code setting effects and one or more to-be-tested sub-regions with unknown target transaction code setting effects. The division module 710 can divide the target region based on a Geohash algorithm. The division module 710 can divide the target region into multiple sub-regions of any shape, for example, a triangle, a rectangle, a diamond, a hexagon, or a circle. Or, the division module 710 can divide the target region based on a map corresponding to the target region. For example, the target region is divided into multiple sub-regions along a road drawing division line.

The acquisition module 720 can obtain data. In some implementations, the acquisition module 720 can obtain association data between the multiple sub-regions, and determine the association feature between the multiple sub-regions based on the association data. In some implementations, the association data can be data that is shared between sub-regions and represents an association relationship between the two sub-regions, reflecting an economic or geographical association relationship, for example, a similarity or dependence, between the two sub-regions. The economic association relationship includes but is not limited to a consumption structure, a consumption level, an industry type, a pillar generation force, etc. The geographical association relationship can include but is not limited to a traffic situation, a geographical structure similarity, a commercial circle distribution similarity, etc. In some embodiments, the association data includes at least one second quantity. The second quantity is a quantity of common users conducting offline network payment transactions in two sub-regions within a first predetermined time period. The acquisition module 720 can communicate with at least one of the end-user device 130 and the storage device 120 to obtain the association data.

In some implementations, the association feature can be information used to represent an association relationship between two sub-regions. The association feature can be constructed based on the association data obtained. In some implementations, the acquisition module 720 can determine whether each of the at least one second quantity is greater than a first predetermined threshold. If the second quantity is greater than the first predetermined threshold, the acquisition module 720 can determine that there is an association relationship between two sub-regions corresponding to the second quantity. Otherwise, there is no association relationship between two sub-regions corresponding to the second quantity. After the previous operation is performed on each second quantity, the acquisition module 720 can construct an association map based on processing results (e.g., whether there is an association relationship between two sub-regions) and use the association map as the association feature between the multiple sub-regions. For example, the acquisition module 720 can use a node to represent a sub-region and a line to represent an association relationship. If there is a line connecting two nodes, there is an association relationship between the two nodes. A graphic consisting of nodes and lines can be considered as the association map (referring to FIG. 9). The acquisition 720 can further determine association strength between two associated sub-regions. The association strength can be used to indicate a degree of intimacy of the association relationship between the two sub-regions. Greater association strength indicates a closer association relationship between the two sub-regions and a higher similarity between the two sub-regions. After determining the association strength between the associated sub-regions, the acquisition module 720 can further construct the association map based on a processing result (e.g., the association strength between the sub-regions), and use the association map constructed twice as the association feature between the multiple sub-regions.

The determining module 730 can perform at least one determining process based on data obtained. In some implementations, the determining module 730 can determine predicted effect values of setting a target transaction code in the one or more to-be-tested sub-regions. The predicted effect value can be a predicted value that may be generated in the future after a target transaction code is set in the to-be-tested sub-region to indicate an estimated effect value of a setting effect. The prediction algorithm can be a graph propagation algorithm. The determining module 730 can obtain the predicted effect values of setting a target transaction code in the one or more to-be-tested sub-regions by using the graph propagation algorithm based on the association feature and estimated effect values of the one or more label sub-regions. In some implementations, the determining module 730 can further determine a label sub-region associated with a to-be-tested sub-region based on the association map, and determine an estimated effect value of setting a target transaction code in the to-be-tested sub-region based on an estimated effect value of the label sub-region and association strength associated with the to-be-tested sub-region. For example, the determining module 730 determines the estimated effect value of setting a target transaction code in the to-be-tested sub-region based on a prediction algorithm similar to a weighted summation algorithm. In some implementations, the determining module 730 can obtain target transaction code usage data of the label sub-region, and determine the estimated effect value based on a first quantity, a first ratio, and a second ratio.

In some implementations, the determining module 730 can determine at least one recommended region for setting a target transaction code from the one or more to-be-tested sub-regions based on at least the one or more predicted effect values. The determining module 730 can compare a predicted effect value of a to-be-tested sub-region with a second predetermined threshold. If the predicted effect value is greater than the second predetermined threshold, the determining module 730 can determine the to-be-tested sub-region where no target transaction code has been set as a recommended region for setting a target transaction code. In some implementations, the determining module 730 can further perform screening based on feature data of the to-be-tested sub-region, and determine whether to use the to-be-tested sub-region as the recommended region based on a screening result and the comparison result of the predicted effect value. After obtaining the feature data of the to-be-tested sub-region and a predetermined condition corresponding to the feature data, the determining module 730 can determine whether the predicted effect value of the to-be-tested sub-region is greater than the second predetermined threshold and whether at least one type of feature data satisfies the predetermined condition. If the predicted effect value is greater than the second predetermined threshold and the at least one type of feature data satisfies the predetermined condition, the determining module 730 can determine the to-be-tested sub-region as a recommended region for setting a target transaction code.

The update module 740 can update at least one of the prediction algorithm and the association feature. In some implementations, the update module 740 can obtain an estimated effect value of at least one to-be-tested sub-region, and update at least one of the prediction algorithm and the association feature based on at least the estimated effect value of the to-be-tested sub-region. The estimated effect value of the to-be-tested sub-region can be an estimated effect value after the to-be-tested sub-region is used as a recommended region and a target transaction code has been set for a period of time (e.g., one week, two weeks, one month, or two months). The update module 740 can determine a difference between the estimated effect value and a predicted effect value of the to-be-tested sub-region, and update at least one of the prediction algorithm and the association feature based on the difference to improve prediction precision. Updating the prediction algorithm can include updating a graph propagation algorithm (e.g., updating an LPA to a GoodDeep algorithm), adjusting algorithm parameters (e.g., updating parameters such as weight values in formula (1), formula (2), and formula (3)), or a combination thereof. Updating the association feature can include updating a parameter in a formula for calculating association strength, updating a parameter in a formula for calculating a predicted effect value, updating a line between nodes in an association map, or a combination thereof. In particular, the update module 740 can update a to-be-tested sub-region whose estimated effect value is greater than the predetermined threshold to a label sub-region, and update a node corresponding to the to-be-tested sub-region in the association map. By way of example only, referring to FIG. 9, assume that a to-be-tested sub-region corresponding to node 15 is determined as a recommended region, and an estimated effect value of the to-be-tested sub-region is greater than the predetermined threshold. In this case, the update module 740 can update a circular node representing the to-be-tested sub-region to a square node. In addition, the update module 740 can further update an algorithm for a predicted effect value of a to-be-tested sub-region corresponding to another node connected to node 15.

For detailed descriptions of functions of the modules in the processing device 110, references can be made to corresponding parts in the flowchart in the present specification. Details are omitted here for simplicity.

It should be understood that the system and the modules of the system shown in FIG. 7 can be implemented in various ways. For example, in some implementations, the system and the modules of the system can be implemented by hardware, software, or a combination of software and hardware. The hardware part can be implemented by using dedicated logic. The software part can be stored in a storage and executed by an appropriate instruction execution system such as a microprocessor or exclusively designed hardware. A person skilled in the art can understand that the previously described methods and systems can be implemented by using a computer executable instruction and/or included in processor-controlled code. For example, such code is provided on a carrier medium such as a disk, a CD, or a DVD-ROM, a programmable memory such as a read-only memory (firmware), or a data carrier such as an optical or electronic signal carrier. The system and the modules of the system in the present specification can be implemented not only by a hardware circuit of an ultra-large-scale integrated circuit or gate array, a semiconductor such as a logical chip or a transistor, or a programmable hardware device such as a field programmable gate array or a programmable logic device, but also by software executed by various types of processors, or can be implemented by a combination (e.g., firmware) of the previous hardware circuit and the software.

It is worthwhile to note that the previous descriptions of the processing device 110 and the modules of the processing device 110 are merely convenient for description, and cannot limit the present specification to the scope of the implementations described. It can be understood that after knowing the principle of the system, a person skilled in the art may randomly combine the modules, or construct a subsystem from the modules for being connected to another module without departing from the principle. For example, in some implementations, the determining module and the update module disclosed in FIG. 7 can be different modules in a system, or can be one module that implements functions of two or more modules. Still for example, the determining module can be divided into an estimated effect value prediction unit and a recommended region determining unit, which are separately configured to determine a predicted effect value of a to-be-tested sub-region, and determine a recommended region. Still for example, the modules in the processing device 110 can share one storage module, or the modules can have respective storage modules. Such changes fall within the protection scope of the present specification.

FIG. 8 is an example schematic diagram illustrating a result of dividing a target region, according to some implementations of the present specification. As shown in FIG. 8, the target region is divided into 42 grids of the same size, for example, 500 m×500 m. A region corresponding to each grid can be a sub-region of the target region. The target region can be divided based on a GeoHash algorithm. Calculation is performed for each obtained grid by using the GeoHash algorithm, to obtain one code. Different codes represent different ranges, and the range is more accurate if a character string obtained is longer. Because codes are determined based on latitude and longitude ranges of regions, the more similar the codes, the closer corresponding regions are, or vice versa. As shown in FIG. 8, regions corresponding to grid 1 and grid 2 are close, codes obtained are also similar. Regions corresponding to grid 1 and grid 36 are distant, a difference between codes obtained is relatively large.

FIG. 9 is a schematic diagram illustrating an example association map, according to some implementations of the present specification. As shown in FIG. 9, a node represents a sub-region, and a line between nodes represents an association relationship between sub-regions. Nodes of different shapes can represent sub-regions of different types. For example, circular nodes can be used to represent the to-be-tested sub-regions (e.g., 13, 15, 16, 17, 12, 5, and 35), and square nodes can be used to represent the label sub-regions (e.g., regions 14, 18, and 24). A number in a node can be used to indicate a number of a sub-region. If there is no line connecting two nodes, there is no association relationship between the two nodes. A thickness of a line between nodes can indicate strength of an association relationship between sub-regions. A thicker line indicates a stronger association relationship between two sub-regions. In addition, a value, namely, w (e.g., from $w_2$ to $w_{22}$ used to indicate strength of an association relationship can be marked on a line between nodes, to intuitively indicate association strength between the nodes.

Some implementations of the present specification further provide an apparatus, including at least a processor and a storage. The storage is configured to store an instruction. When the instruction is executed by the processor, the apparatus implements the previously described method for recommending a target transaction code setting region. The method can include the following: dividing a target region to obtain multiple sub-regions, where the multiple sub-regions include one or more label sub-regions with known target transaction code setting effects and one or more to-be-tested sub-regions with unknown target transaction code setting effects; obtaining an association feature between the multiple sub-regions; obtaining predicted effect values of setting a target transaction code in the one or more to-be-tested sub-regions by using a prediction algorithm based on at least estimated effect values of setting a target transaction code in the one or more label sub-regions and the association feature; and determining at least one recommended region for setting a target transaction code from the one or more to-be-tested sub-regions based on at least the one or more predicted effect values.

Some implementations of the present specification further provide a computer-readable storage medium. The storage medium stores a computer instruction, and after a computer reads the computer instruction in the storage medium, the computer implements the previously described method for recommending a target transaction code setting region. The method can include the following: dividing a target region to obtain multiple sub-regions, where the multiple sub-regions include one or more label sub-regions with known target transaction code setting effects and one or more to-be-tested sub-regions with unknown target transaction code setting effects; obtaining an association feature between the multiple sub-regions; obtaining predicted effect values of setting a target transaction code in the one or more to-be-tested sub-regions by using a prediction algorithm based on at least estimated effect values of setting a target transaction code in the one or more label sub-regions and the association feature; and determining at least one recommended region for setting a target transaction code from the one or more to-be-tested sub-regions based on at least the one or more predicted effect values.

Possible beneficial effects of the implementations of the present specification include but are not limited to the following: (1) In the implementations of the present specification, whether setting a target transaction code is proper is analyzed for multi-dimensional data generated in each region (e.g., any region worldwide) through big data, which is more efficient, comprehensive, and objective than offline manual investigation. (2) During a region analysis, a region is evaluated by using multiple features including a population concentration, for example, population conversion, a store feature, a region feature, and a time feature, so that selection accuracy of a setting region is higher. (3) A known setting region is labeled by using a setting effect of the known region, and a recommended region for setting with a similar effect is obtained by using a relationship between regions, namely, a similarity, so that the recommended region can obtain a better setting effect. (4) After a recommended region is determined, an effect of setting a target transaction code in the recommended region can be monitored, and an existing recommendation solution is updated based on the setting effect, so that the solutions can be self-optimized. As time passes by, accuracy of the solutions is higher, and the setting effect of the recommended region obtained is also better. It is worthwhile to note that beneficial effects that may be generated in different implementations are different. In different implementations, beneficial effects that may be generated can be any one or a combination of the previous beneficial effects, or can be any other beneficial effect that may be obtained.

The basic concept has been described above. Clearly, for a person skilled in the art, the detailed disclosure is merely an example, but does not constitute a limitation on the present specification. Although not expressly stated here, a person skilled in the art may make various modifications, improvements, and amendments to the present specification. Such modifications, improvements, and amendments are proposed in the present specification. Therefore, such modifications, improvements, and amendments still fall within the spirit and scope of the example implementations of the present specification.

Meanwhile, specific words are used in the present specification to describe the implementations of the present specification. For example, at least one of "one implementation", "an implementation", and "some implementations" means a feature, structure, or characteristic related to at least one implementation of the present specification. Therefore, it is worthwhile to emphasize and note that "an implementation", "one implementation" or "an alternative implementation" mentioned twice or multiple times in different locations in the present specification does not necessarily mean the same implementation. In addition, some features, structures, or characteristics in one or more implementations of the present specification can be appropriately combined.

In addition, a person skilled in the art can understand that the aspects of the present specification can be described by using several patentable categories or situations, including any new and useful combination of processes, machines, products, or substances, or any new and useful improvement to them. Correspondingly, the aspects of the present specification can be executed by hardware, can be executed by software (including firmware, resident software, microcode, etc.), or can be executed by a combination of hardware and software. Each of the hardware and the software can be referred to as "data block", "module", "engine", "unit", "component", or "system". In addition, the aspects of the present specification may be represented by a computer product located in one or more computer-readable media, and the product includes computer-readable program code.

A computer storage medium may include a propagated data signal that includes computer program code. For example, the propagated data signal is located on a baseband or is a part of a carrier. The propagated signal may be represented in many forms including an electromagnetic form, an optical form, etc., or a suitable combination form. The computer storage medium can be any computer-readable medium other than the computer-readable storage medium, and the medium can be connected to an instruction execution system, apparatus, or device to implement communication, propagation, or transmission of a program for use. The program code located on the computer storage medium can be propagated through any suitable medium, including radio, a cable, a fiber optic cable, RF, etc., or any combination thereof.

Computer program code needed for each part of the operations of the present specification can be written in any one or more program languages, including object-oriented programming languages such as Java, Scala, Smalltalk, Eiffel, JADE, Emerald, C++, C#, VB.NET, Python, etc., conventional programming languages such as C language, VisualBasic, Fortran2003, Perl, COBOL2002, PHP, or ABAP, dynamic programming languages such as Python, Ruby, or Groovy, or other programming languages. The program code can run entirely on a user computer, or run as an independent software package on a user computer, or run partially on a user computer and partially on a remote computer, or run entirely on a remote computer or a processing device. In the latter situations, the remote computer can be connected to a user computer through any form of network such as a LAN or a WAN, or connected to an external computer (e.g., through the Internet), or in a cloud computing environment, or used as a service, such as software as a service (SaaS).

In addition, unless expressly stated in the claims, the order of the processing elements and sequences described in the present specification, the use of numbers and letters, and the use of other names are not intended to limit the order of the processes and methods described in the present specification. Although some implementations of the present disclosure that are considered useful currently are discussed in various examples in the disclosure, it should be understood that such details are for illustrative purposes only, the claims are not limited to the disclosed implementations, and on the contrary, the claims are intended to cover all modifications and equivalent combinations that conform to the essence and scope of the implementations of the present specification.

For example, although the system components described above can be implemented by a hardware device, the system components can be implemented only by software. For example, the described system is installed on an existing processing device or mobile device.

Similarly, it is worthwhile to note that in order to simplify the description disclosed in the present specification and help understand one or more implementations of the present disclosure, in the previous descriptions of the implementations of the present specification, multiple features are sometimes incorporated into one implementation, one accompanying drawing, or descriptions of the implementation or the accompanying drawing. However, this disclosure method does not mean that features needed by the object of the present specification are more than the features mentioned in the claims. Actually, the features of the implementations are less than all features in a single implementation disclosed above.

Numbers describing a quantity of components and a quantity of attributes are used in some implementations. It should be understood that such numbers used for describing the implementations are modified by modifiers such as "approximately", "about", or "generally". Unless otherwise stated, "approximately", "about", or "generally" indicates that a change of ±20% is allowed for the number. Correspondingly, in some implementations, numeric parameters used in the present specification and the claims are approximations, and the approximations can change based on features needed by individual implementations. In some implementations, for numeric parameters, specified significant digits should be considered, and a general digit retention method should be used. Although a value field and a parameter used in some implementations of the present specification to determine the range are approximations, in specific implementations, such values are set as precisely as possible.

Patents, patent applications, patent application publications and other materials, such as articles, books, instructions, publications, and documents, cited for the present specification are incorporated here by reference in its entirety, except for application history documents that are inconsistent with or conflict with the content of the present specification, documents (currently or subsequently attached to the present specification) limiting the widest scope of the claims of the present specification. It is worthwhile to note that, if at least one of the description, the definition, and the use of a term in the auxiliary material of the present specification is inconsistent with or conflicts with the content of the present specification, the at least one of the description, the definition, and the use of the term of the present specification shall prevail.

Finally, it should be understood that the implementations described in the present specification are merely used to describe the principle of the implementations of the present specification, and other variations may also fall within the scope of the present specification. Therefore, as an example instead of a limitation, alternative configurations in the implementations of the present specification can be considered consistent with the guidance of the present specification. Correspondingly, implementations of the present specification are not limited to the implementations expressly described in the present specification.

What is claimed is:

1. A computer-implemented method comprising:
dividing a target region to obtain multiple sub-regions wherein the multiple sub-regions comprise one or more label sub-regions with known target transaction code setting effects and one or more sample sub-regions with unknown target transaction code setting effects;
generating a hash value for each sub-region of the multiple sub-regions based on a hash function and a location of each sub-region of the multiple sub-regions, wherein each sub-region of the multiple sub-regions corresponds to a different hash value represented by a unique code string, and wherein proximity of two or more sub-regions of the multiple sub-regions is determined based on a comparison score representing a degree of similarity between two or more hash values corresponding to the two or more sub-regions of the multiple sub-regions;
obtaining, over a network from a user device, a first portion of association data among the multiple sub-regions, the first portion of the association data comprising payment transaction data related to the user device scanning a target transaction code;
obtaining, a second portion of the association data among the multiple sub-regions, wherein the second portion of the association data comprises a first relationship between a first sub-region where the target transaction code has been set and a second sub-region where the target transaction code has not been set, and wherein the first sub-region corresponds to a first location represented by a first hash value and the second sub-region corresponds to a second location represented by a second hash value;
generating, based on the first and second portions of the association data, an association feature comprising a plurality of associations between the multiple sub-regions based on the association data, wherein the plurality of associations comprises a first association between the first sub-region and the second sub-region;
generating a plurality of distance parameters, wherein the plurality of distance parameters comprises a first distance parameter representing a distance between the first sub-region and the second sub-region, wherein the first distance parameter is calculated based on a first comparison score, and wherein the first comparison score represents a degree of similarity between the first hash value representing the first location of the first sub-region and the second hash value representing the second location of the second sub-region;
generating a plurality of weight values corresponding to the association feature, wherein the plurality of weight values comprises a first weight value representing the first association, wherein the first weight value is calculated based on the first distance parameter and a hyperparameter, and wherein the hyperparameter comprises a numerical value associated with the association data and the first relationship between the first sub-region and the second sub-region;
obtaining a predicted effect value of setting the target transaction code in the second sub-region by using the plurality of weight values and the association feature;
determining, based on at least the predicted effect value, a recommended region, wherein the recommended region comprises the second sub-region;
providing the target transaction code to the user device located within the recommended region;
receiving, from the user device, in response to providing the target transaction code, (i) information indicative of completion of a transaction within the recommended region and (ii) subsequent payment transaction data corresponding to the transaction; and updating the association feature based on the subsequent payment transaction data.

2. The computer-implemented method of claim 1, further comprising:
obtaining an estimated effect value of at least one sample sub-region; and
updating at least one of the plurality of weight values and the association feature based on at least the estimated effect value of the sample sub-region.

3. The computer-implemented method of claim 2, wherein updating at least one of the plurality of weight values and the association feature based on at least the estimated effect value of the sample sub-region comprises:
updating at least one of the plurality of weight values and the association feature based on a difference between the estimated effect value of the sample sub-region and a predicted effect value of the sample sub-region.

4. The computer-implemented method of claim 2, wherein updating at least one of the plurality of weight values and the association feature based on at least the estimated effect value of the sample sub-region comprises:
updating a sample sub-region whose estimated effect value is greater than a predetermined threshold to a label sub-region.

5. The computer-implemented method of claim 1, wherein the target transaction code comprises at least one or more of a red packet code, a collection code, a promo code, and a redeem code.

6. The computer-implemented method of claim 1, wherein the label sub-regions comprise a region in which the target transaction code has been set; and a step of obtaining estimated effect values of setting the target transaction code in the one or more label sub-regions comprises:
obtaining target transaction code usage data of a label sub-region, wherein the target transaction code usage data comprises a first quantity of merchants conducting offline network payment transactions using the target transaction code in the label sub-region, a first ratio of a quantity of offline network payment transactions using the target transaction code to a total quantity of transactions for each of the first quantity of merchants in the label sub-region, and a second ratio of a quantity of users conducting offline network payment transactions using the target transaction code to a total quantity of users in the label sub-region; and
determining an estimated effect value based on the first quantity, the first ratio, and the second ratio.

7. The computer-implemented method of claim 1, wherein the association data comprises at least one second quantity, and the second quantity is a quantity of common users conducting offline network payment transactions in two sub-regions within a first predetermined time period; and
generating the association feature based on the association data comprises:
determining whether the second quantity is greater than a first predetermined threshold; and
if the second quantity is greater than the first predetermined threshold, determining an association relationship between the two sub-regions related to the second quantity to construct an association map, and determining the association map as the association feature between the multiple sub-regions.

8. The computer-implemented method of claim 1, wherein obtaining the predicted effect value of setting the target transaction code in the second sub-region comprises using a graph propagation algorithm.

9. The computer-implemented method of claim 1, wherein the association data comprises at least one second quantity, and the second quantity is a quantity of common users conducting offline network payment transactions in two sub-regions within a first predetermined time period; and
generating the association feature between the multiple sub-regions based on the association data comprises:
determining, based on the second quantity, whether there is an association between the two sub-regions related to the second quantity and association strength to construct an association map, and determining the association map as the association feature between the multiple sub-regions, wherein the association strength is positively correlated with the second quantity.

10. The computer-implemented method of claim 9, wherein the method further comprises:
determining a label sub-region associated with a sample sub-region based on the association map; and
determining a predicted effect value of setting the target transaction code in the sample sub-region based on an estimated effect value of the label sub-region associated with the sample sub-region and association strength associated with the sample sub-region.

11. The computer-implemented method of claim 1, wherein determining based on at least the predicted effect value, the recommended region, wherein the recommended region comprises the second sub-region comprises:
determining whether a predicted effect value of a sample sub-region in which no target transaction code has been set is greater than a second predetermined threshold;
determining that the predicted effect value of the sample sub-region is greater than the second predetermined threshold; and
responsive to determining that the predicted effect value of the sample sub-region is greater than the second predetermined threshold, determining the sample sub-region in which no target transaction code has been set as the recommended region for setting the target transaction code.

12. The computer-implemented method of claim 1, wherein determining based on at least the predicted effect value, the recommended region, wherein the recommended region comprises the second sub-region comprises:
obtaining feature data of the one or more sample sub-regions and a predetermined condition corresponding to the feature data, wherein the feature data comprises:
a third quantity of users conducting offline network payment transactions within a second predetermined time period in a sample sub-region,
a fourth quantity of merchants conducting offline network payment transactions within the second predetermined time period in the sample sub-region,
a third ratio comparing the fourth quantity of merchants conducting offline network payment transactions within the second predetermined time period in the sample sub-region to a total quantity of merchants in the sample sub-region, or
a type of a point of interest corresponding to the sample sub-region;
determining a predicted effect value of the sample sub-region is greater than a second predetermined threshold and at least one type of feature data satisfies the predetermined condition; and
responsive to determining the predicted effect value of the sample sub-region is greater than the second predetermined threshold and the at least one type of feature data satisfies the predetermined condition, determining the sample sub-region as the recommended region for setting the target transaction code.

13. The computer-implemented method of claim 12, wherein the predetermined condition comprises at least one or more of:
the third quantity is greater than a third predetermined threshold;
the fourth quantity is greater than a fourth predetermined threshold;
the third ratio is greater than a fifth predetermined threshold; and
the type of the point of interest is the same as at least one predetermined type of a point of interest.

14. The computer-implemented method of claim 1, wherein the method further comprises:
combining adjacent recommended regions.

15. A non-transitory, computer-readable medium storing one or more instructions executable by a computer system to perform operations comprising:
dividing a target region to obtain multiple sub-regions wherein the multiple sub-regions comprise one or more label sub-regions with known target transaction code setting effects and one or more sample sub-regions with unknown target transaction code setting effects;
generating a hash value for each sub-region of the multiple sub-regions based on a hash function and a location of each sub-region of the multiple sub-regions, wherein each sub-region of the multiple sub-regions corresponds to a different hash value represented by a unique code string, and wherein proximity of two or more sub-regions of the multiple sub-regions is determined based on a comparison score representing a degree of similarity between two or more hash values corresponding to the two or more sub-regions of the multiple sub-regions;
obtaining, over a network from a user device, a first portion of association data among the multiple sub-regions, the first portion of the association data comprising payment transaction data related to the user device scanning a target transaction code;
obtaining, a second portion of the association data among the multiple sub-regions, wherein the second portion of the association data comprises a first relationship between a first sub-region where the target transaction code has been set and a second sub-region where the target transaction code has not been set, and wherein the first sub-region corresponds to a first location represented by a first hash value and the second sub-region corresponds to a second location represented by a second hash value;
generating, based on the first and second portions of the association data, an association feature comprising a plurality of associations between the multiple sub-regions based on the association data, wherein the plurality of associations comprises a first association between the first sub-region and the second sub-region;
generating a plurality of distance parameters, wherein the plurality of distance parameters comprises a first distance parameter representing a distance between the first sub-region and the second sub-region, wherein the first distance parameter is calculated based on a first comparison score, and wherein the first comparison score represents a degree of similarity between the first hash value representing the first location of the first sub-region and the second hash value representing the second location of the second sub-region;
generating a plurality of weight values corresponding to the association feature, wherein the plurality of weight values comprises a first weight value representing the first association, wherein the first weight value is calculated based on the first distance parameter and a hyperparameter, and wherein the hyperparameter comprises a numerical value associated with the association data and the first relationship between the first sub-region and the second sub-region;
obtaining a predicted effect value of setting the target transaction code in the second sub-region by using the plurality of weight values and the association feature;
determining, based on at least the predicted effect value, a recommended region, wherein the recommended region comprises the second sub-region;
providing the target transaction code to the user device located within the recommended region;
receiving, from the user device, in response to providing the target transaction code, (i) information indicative of completion of a transaction within the recommended region and (ii) subsequent payment transaction data corresponding to the transaction; and
updating the association feature based on the subsequent payment transaction data.

16. The non-transitory, computer-readable medium of claim 15, wherein the operations further comprise:
obtaining an estimated effect value of at least one sample sub-region; and
updating at least one of the plurality of weight values and the association feature based on at least the estimated effect value of the sample sub-region.

17. The non-transitory, computer-readable medium of claim 16, wherein updating at least one of the plurality of weight values and the association feature based on at least the estimated effect value of the sample sub-region comprises:
updating at least one of the plurality of weight values and the association feature based on a difference between the estimated effect value of the sample sub-region and a predicted effect value of the sample sub-region.

18. The non-transitory, computer-readable medium of claim 16, wherein updating at least one of the plurality of weight values and the association feature based on at least the estimated effect value of the sample sub-region comprises:
updating a sample sub-region whose estimated effect value is greater than a predetermined threshold to a label sub-region.

19. The non-transitory, computer-readable medium of claim 15, wherein the label sub-regions comprise a region in which the target transaction code has been set; and a step of obtaining estimated effect values of setting the target transaction code in the one or more label sub-regions comprises:
obtaining target transaction code usage data of a label sub-region, wherein the target transaction code usage data comprises a first quantity of merchants conducting offline network payment transactions using the target transaction code in the label sub-region, a first ratio of a quantity of offline network payment transactions using the target transaction code to a total quantity of transactions for each of the first quantity of merchants in the label sub-region, and a second ratio of a quantity of users conducting offline network payment transactions using the target transaction code to a total quantity of users in the label sub-region; and determining an estimated effect value based on the first quantity, the first ratio, and the second ratio.

20. The non-transitory, computer-readable medium of claim 15, wherein the association data comprises at least one second quantity, and the second quantity is a quantity of common users conducting offline network payment transactions in two sub-regions within a first predetermined time period; and
generating the association feature based on the association data comprises:
determining whether the second quantity is greater than a first predetermined threshold; and
if the second quantity is greater than the first predetermined threshold, determining an association relationship between the two sub-regions related to the second quantity to construct an association map, and determining the association map as the association feature between the multiple sub-regions.

21. The non-transitory, computer-readable medium of claim 15, wherein determining based on at least the predicted effect value, the recommended region, wherein the recommended region comprises the second sub-region comprises:
determining whether a predicted effect value of a sample sub-region in which no target transaction code has been set is greater than a second predetermined threshold;
determining that the predicted effect value of the sample sub-region is greater than the second predetermined threshold; and
responsive to determining that the predicted effect value of the sample sub-region is greater than the second predetermined threshold, determining the sample sub-region in which no target transaction code has been set as the recommended region for setting the target transaction code.

22. The non-transitory, computer-readable medium of claim 15, wherein determining based on at least the predicted effect value, the recommended region, wherein the recommended region comprises the second sub-region comprises:
obtaining feature data of the one or more sample sub-regions and a predetermined condition corresponding to the feature data, wherein the feature data comprises:
a third quantity of users conducting offline network payment transactions within a second predetermined time period in a sample sub-region,
a fourth quantity of merchants conducting offline network payment transactions within the second predetermined time period in the sample sub-region,
a third ratio comparing the fourth quantity of merchants conducting offline network payment transactions within the second predetermined time period in the sample sub-region to a total quantity of merchants in the sample sub-region, or
a type of a point of interest corresponding to the sample sub-region;
determining a predicted effect value of the sample sub-region is greater than a second predetermined threshold and at least one type of feature data satisfies the predetermined condition; and
responsive to determining the predicted effect value of the sample sub-region is greater than the second predetermined threshold and the at least one type of feature data satisfies the predetermined condition, determining the sample sub-region as the recommended region for setting the target transaction code.

23. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
dividing a target region to obtain multiple sub-regions wherein the multiple sub-regions comprise one or more label sub-regions with known target transaction code setting effects and one or more sample sub-regions with unknown target transaction code setting effects;
generating a hash value for each sub-region of the multiple sub-regions based on a hash function and a location of each sub-region of the multiple sub-regions, wherein each sub-region of the multiple sub-regions corresponds to a different hash value represented by a unique code string, and wherein proximity of two or more sub-regions of the multiple sub-regions is determined based on a comparison score representing a degree of similarity between two or more hash values corresponding to the two or more sub-regions of the multiple sub-regions;
obtaining, over a network from a user device, a first portion of association data among the multiple sub-regions, the first portion of the association data comprising payment transaction data related to the user device scanning a target transaction code;
obtaining, a second portion of the association data among the multiple sub-regions, wherein the second portion of the association data comprises a first relationship between a first sub-region where the target transaction code has been set and a second sub-region where the target transaction code has not been set, and wherein the first sub-region corresponds to a first location represented by a first hash value and the second sub-region corresponds to a second location represented by a second hash value;
generating, based on the first and second portions of the association data, an association feature comprising a plurality of associations between the multiple sub-regions based on the association data, wherein the plurality of associations comprises a first association between the first sub-region and the second sub-region;
generating a plurality of distance parameters, wherein the plurality of distance parameters comprises a first distance parameter representing a distance between the first sub-region and the second sub-region, wherein the first distance parameter is calculated based on a first comparison score, and wherein the first comparison score represents a degree of similarity between the first hash value representing the first location of the first sub-region and the second hash value representing the second location of the second sub-region;
generating a plurality of weight values corresponding to the association feature, wherein the plurality of weight values comprises a first weight value representing the first association, wherein the first weight value is calculated based on the first distance parameter and a hyperparameter, and wherein the hyperparameter comprises a numerical value associated with the association data and the first relationship between the first sub-region and the second sub-region;
obtaining a predicted effect value of setting the target transaction code in the second sub-region by using the plurality of weight values and the association feature;

determining, based on at least the predicted effect value, a recommended region, wherein the recommended region comprises the second sub-region;

providing the target transaction code to the user device located within the recommended region;

receiving, from the user device, in response to providing the target transaction code, (i) information indicative of completion of a transaction within the recommended region and (ii) subsequent payment transaction data corresponding to the transaction; and updating the association feature based on the subsequent payment transaction data.

24. The computer-implemented system of claim 23, wherein the label sub-regions comprise a region in which the target transaction code has been set; and a step of obtaining estimated effect values of setting the target transaction code in the one or more label sub-regions comprises:

obtaining target transaction code usage data of a label sub-region, wherein the target transaction code usage data comprises a first quantity of merchants conducting offline network payment transactions using the target transaction code in the label sub-region, a first ratio of a quantity of offline network payment transactions using the target transaction code to a total quantity of transactions for each of the first quantity of merchants in the label sub-region, and a second ratio of a quantity of users conducting offline network payment transactions using the target transaction code to a total quantity of users in the label sub-region; and determining an estimated effect value based on the first quantity, the first ratio, and the second ratio.

25. The computer-implemented system of claim 23, wherein determining based on at least the predicted effect value, the recommended region, wherein the recommended region comprises the second sub-region comprises:

determining whether a predicted effect value of a sample sub-region in which no target transaction code has been set is greater than a second predetermined threshold;

determining that the predicted effect value of the sample sub-region is greater than the second predetermined threshold; and responsive to determining that the predicted effect value of the sample sub-region is greater than the second predetermined threshold, determining the sample sub-region in which no target transaction code has been set as the recommended region for setting the target transaction code.

26. The computer-implemented system of claim 23, wherein determining based on at least the predicted effect value, the recommended region, wherein the recommended region comprises the second sub-region comprises:

obtaining feature data of the one or more sample sub-regions and a predetermined condition corresponding to the feature data, wherein the feature data comprises:

a third quantity of users conducting offline network payment transactions within a second predetermined time period in a sample sub-region, a fourth quantity of merchants conducting offline network payment transactions within the second predetermined time period in the sample sub-region, a third ratio comparing the fourth quantity of merchants conducting offline network payment transactions within the second predetermined time period in the sample sub-region to a total quantity of merchants in the sample sub-region, or a type of a point of interest corresponding to the sample sub-region;

determining a predicted effect value of the sample sub-region is greater than a second predetermined threshold and at least one type of feature data satisfies the predetermined condition; and responsive to determining the predicted effect value of the sample sub-region is greater than the second predetermined threshold and the at least one type of feature data satisfies the predetermined condition, determining the sample sub-region as the recommended region for setting the target transaction code.

* * * * *